(12) United States Patent
Taketa et al.

(10) Patent No.: US 12,474,589 B2
(45) Date of Patent: Nov. 18, 2025

(54) TECHNIQUES FOR RECEIVING USER INFORMATION AND/OR DEVICE FIT INFORMATION

(71) Applicant: Apple Inc., Cupertino, CA (US)

(72) Inventors: Ryan Taketa, Corte Madera, CA (US); Heather L. Smith, San Jose, CA (US); Daniel G. Romano, San Jose, CA (US); Jay Moon, San Francisco, CA (US); Amy E. Dedonato, San Francisco, CA (US); Jonathan R. Dascola, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/398,961

(22) Filed: Dec. 28, 2023

(65) Prior Publication Data
US 2024/0319512 A1  Sep. 26, 2024

Related U.S. Application Data

(60) Provisional application No. 63/470,426, filed on Jun. 1, 2023, provisional application No. 63/454,001, filed on Mar. 22, 2023.

(51) Int. Cl.
| | |
|---|---|
| *G06Q 30/0601* | (2023.01) |
| *G02B 27/00* | (2006.01) |
| *G02B 27/01* | (2006.01) |

(52) U.S. Cl.
CPC ..... *G02B 27/0176* (2013.01); *G02B 27/0093* (2013.01); *G06Q 30/0641* (2013.01); *G02B 2027/0141* (2013.01)

(58) Field of Classification Search
CPC ............ G02B 27/0176; G02B 27/0093; G02B 2027/0141; G02B 27/017; G06Q 30/0641
See application file for complete search history.

(56) References Cited

U.S. PATENT DOCUMENTS

| | | | |
|---|---|---|---|
| 10,482,421 B1 * | 11/2019 | Ducrou | G06V 20/54 |
| 11,128,636 B1 * | 9/2021 | Jorasch | G06F 3/0346 |
| 2002/0105530 A1 * | 8/2002 | Waupotitsch | G02C 13/003 |
| | | | 345/630 |
| 2012/0246007 A1 * | 9/2012 | Williams | G06Q 30/02 |
| | | | 705/14.66 |
| 2013/0088490 A1 * | 4/2013 | Rasmussen | G06T 19/006 |
| | | | 345/421 |
| 2014/0300907 A1 * | 10/2014 | Kimmel | G06T 7/62 |
| | | | 356/625 |
| 2015/0055086 A1 * | 2/2015 | Fonte | H04L 65/403 |
| | | | 700/98 |
| 2016/0170996 A1 * | 6/2016 | Frank | G06F 16/904 |
| | | | 707/748 |
| 2017/0010771 A1 * | 1/2017 | Bernstein | G06F 1/1613 |
| 2017/0046769 A1 * | 2/2017 | Jackson | G06Q 30/0643 |

(Continued)

OTHER PUBLICATIONS

International Search Report and Written Opinion received for PCT Patent Application No. PCT/US2024/018722, mailed on Aug. 5, 2024, 18 pages.

(Continued)

*Primary Examiner* — Ibrahim A Khan
(74) *Attorney, Agent, or Firm* — DLA Piper LLP (US)

(57) ABSTRACT

The present disclosure generally relates to receiving user information and/or device fit information.

63 Claims, 28 Drawing Sheets

(56) References Cited

U.S. PATENT DOCUMENTS

| | | | | |
|---|---|---|---|---|
| 2017/0103160 | A1* | 4/2017 | Hynes | G09B 9/058 |
| 2018/0336737 | A1* | 11/2018 | Varady | G06T 7/50 |
| 2019/0035149 | A1* | 1/2019 | Chen | G06V 40/166 |
| 2019/0384874 | A1* | 12/2019 | Riley | G06T 15/005 |
| 2020/0034016 | A1* | 1/2020 | Boissonneault | G06F 3/0487 |
| 2021/0088811 | A1* | 3/2021 | Varady | G06V 40/171 |
| 2021/0373676 | A1* | 12/2021 | Jorasch | A63F 13/215 |
| 2022/0301041 | A1* | 9/2022 | Lee | G06F 9/453 |
| 2022/0319075 | A1* | 10/2022 | Hu | H04L 51/10 |
| 2023/0186567 | A1* | 6/2023 | Koh | G06F 30/12 |
| | | | | 345/419 |

OTHER PUBLICATIONS

Invitation to Pay Additional Fees received for PCT Patent Application No. PCT/US2024/018722, mailed on Jun. 14, 2024, 11 pages.
International Preliminary Report on Patentability received for PCT Patent Application No. PCT/US2024/018722, mailed on Oct. 2, 2025, 13 pages.

* cited by examiner

FIG. 6B1

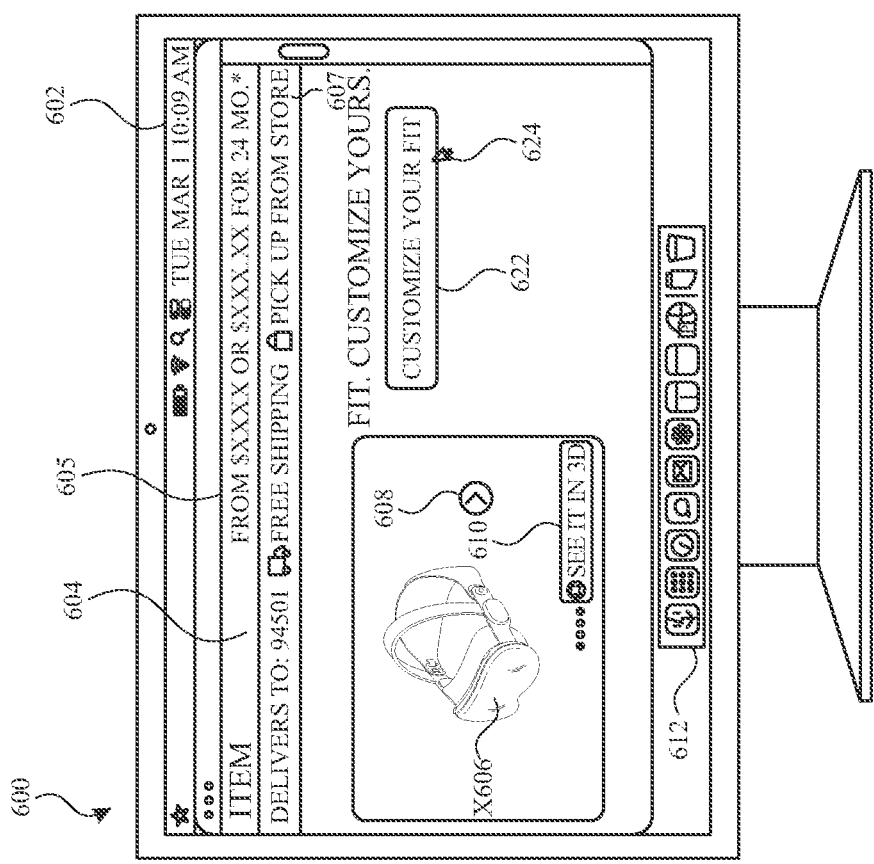
FIG. 6B2

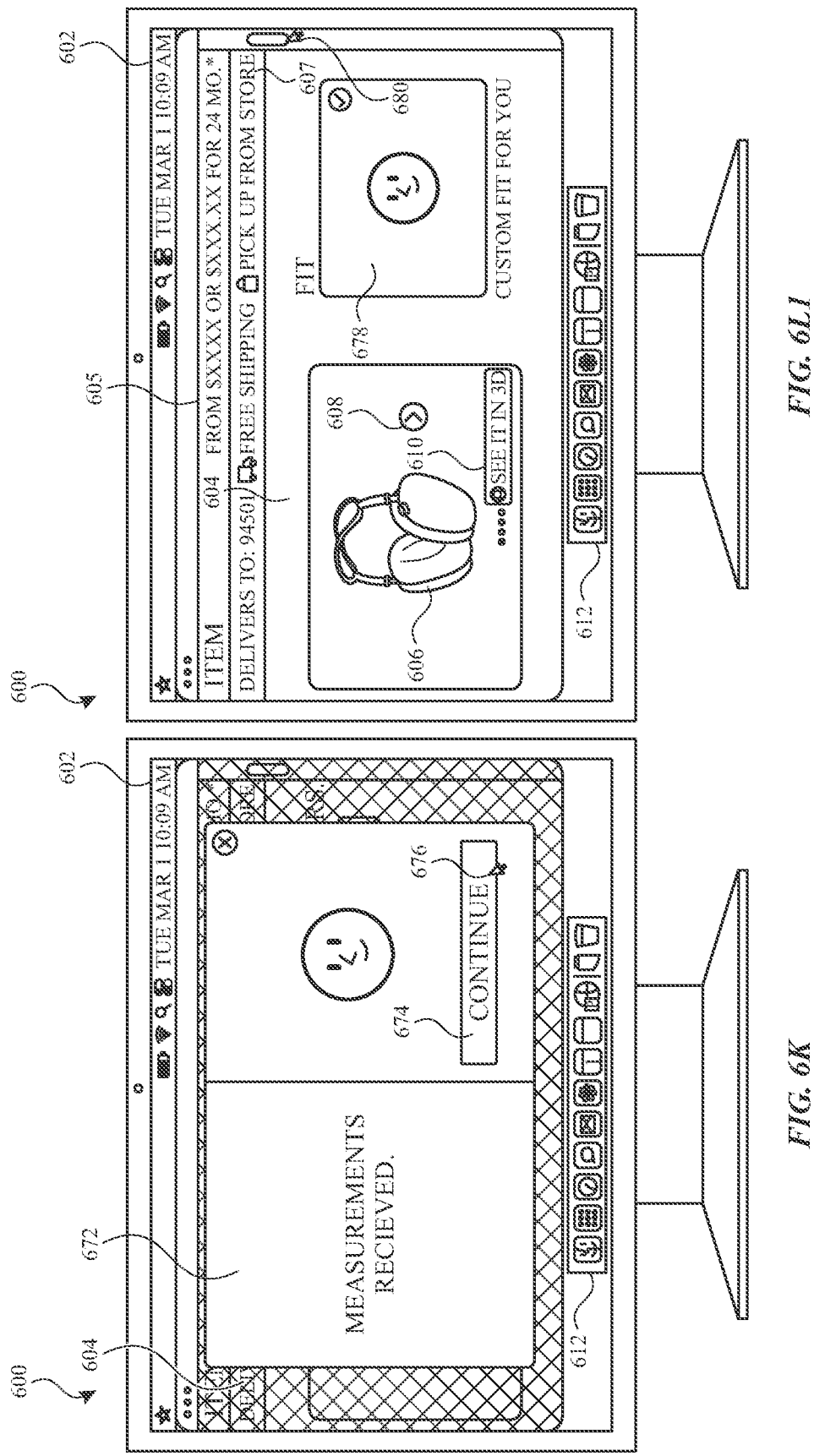

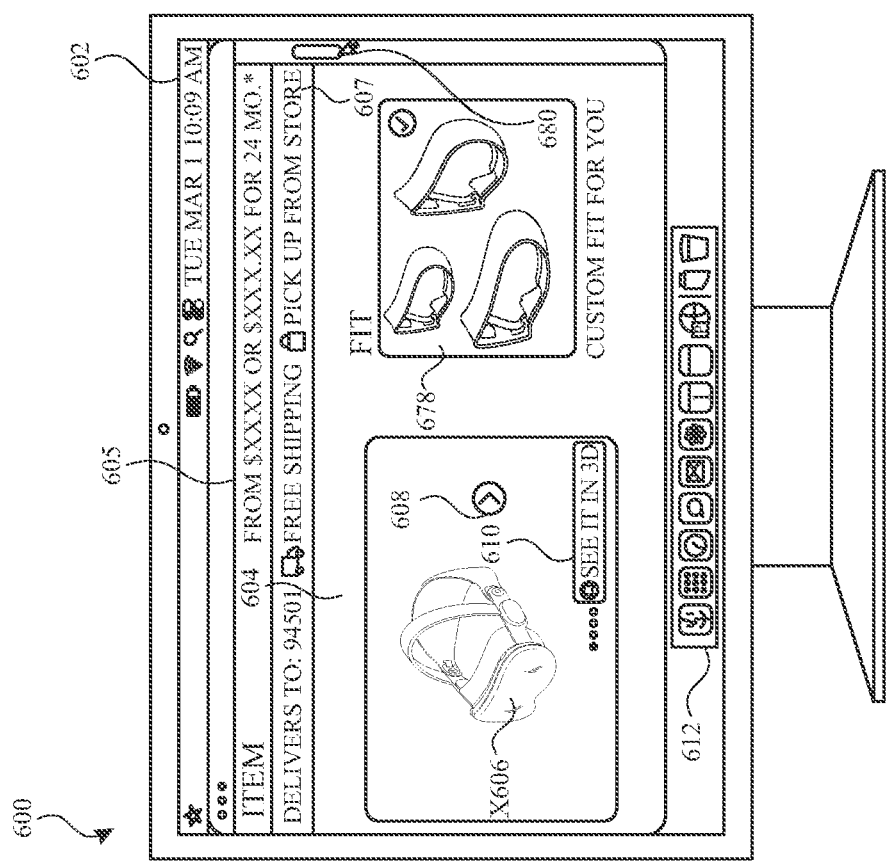

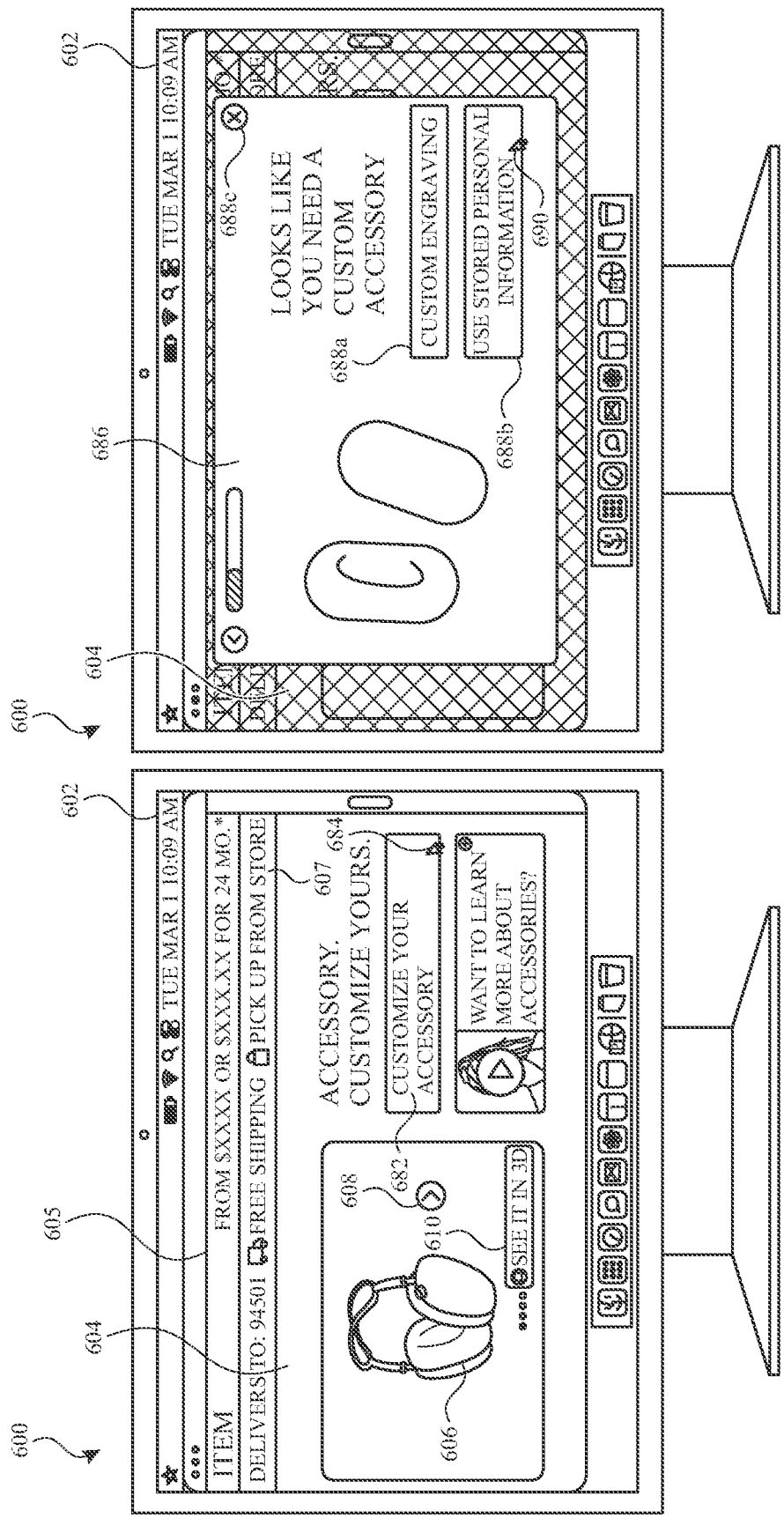

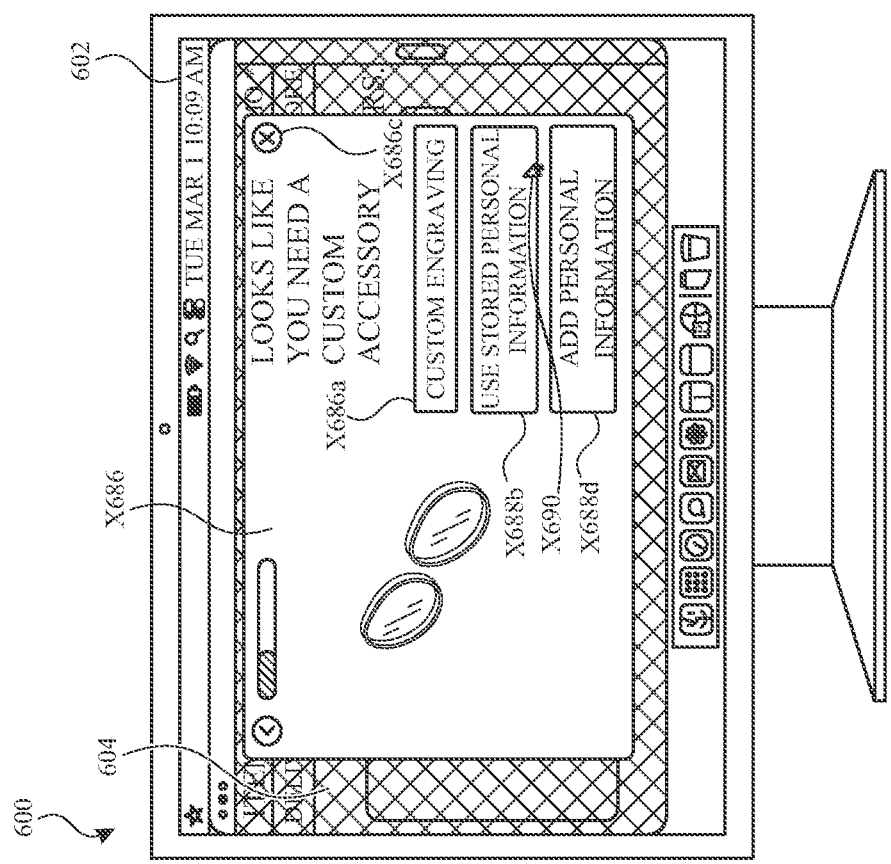
FIG. 6N2

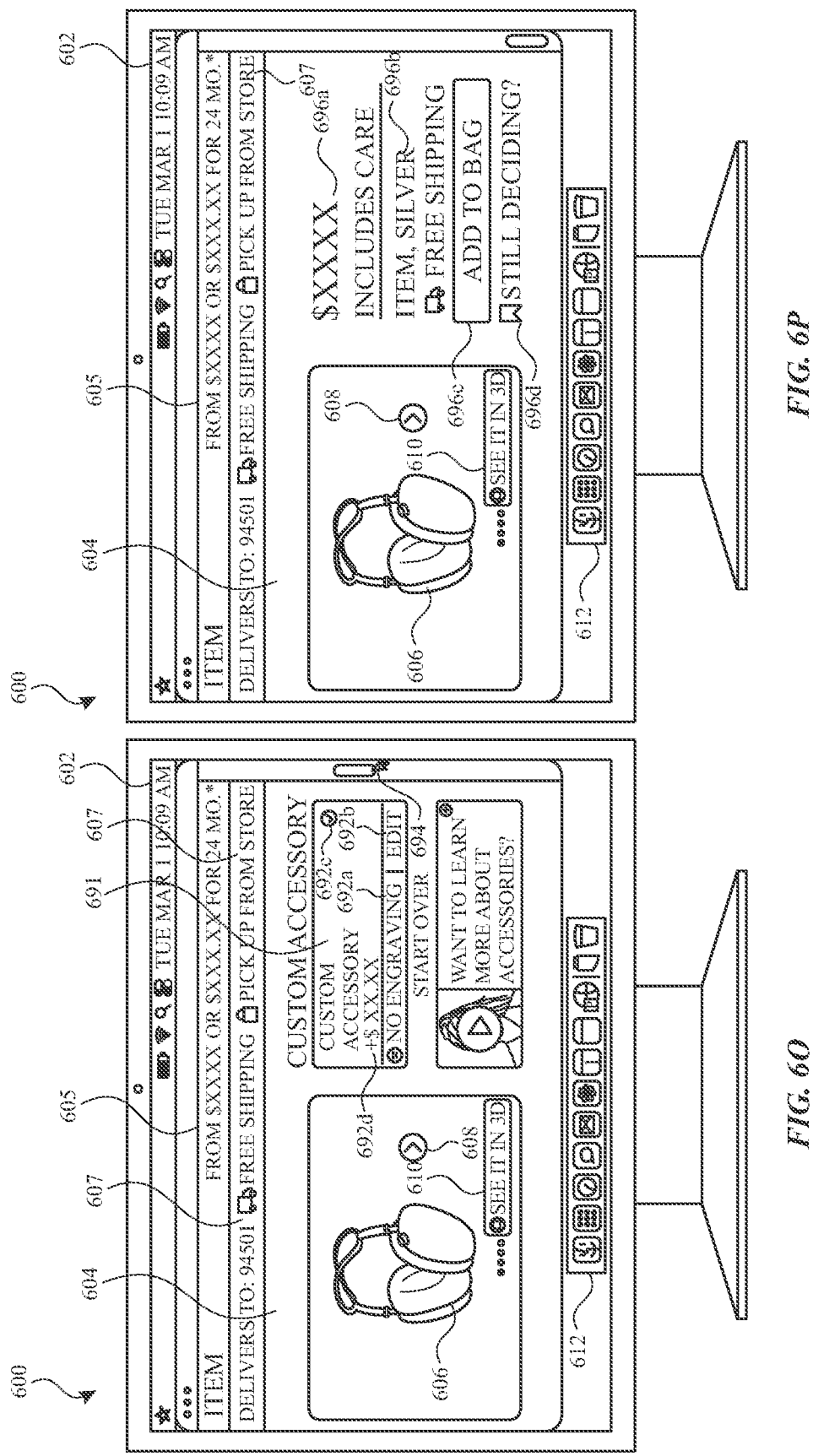

800

802
Receive, via the one or more input devices, device fit information corresponding to information about a head of a person and a first item, wherein:

804
The first item is configurable in a plurality of physical dimension configurations.

806
The device fit information is indicative of a first physical dimension configuration of the plurality of physical dimension configurations.

808
Provide the device fit information corresponding to the head of the person and the first item to a first external device separate from the computer system.

*FIG. 8*

TECHNIQUES FOR RECEIVING USER INFORMATION AND/OR DEVICE FIT INFORMATION

CROSS-REFERENCE TO THE RELATED APPLICATIONS

This application claims priority to U.S. Provisional Application No. 63/454,001, filed Mar. 22, 2023, and entitled "TECHNIQUES FOR RECEIVING USER INFORMATION AND/OR DEVICE FIT INFORMATION," and to U.S. Provisional Application No. 63/470,426, filed Jun. 1, 2023, and entitled "TECHNIQUES FOR RECEIVING USER INFORMATION AND/OR DEVICE FIT INFORMATION," the entire contents of which are hereby incorporated by reference.

FIELD

The present disclosure relates generally to computer user interfaces, and more specifically to techniques for receiving user information and/or device fit information.

BACKGROUND

The development of computer systems for various purposes, including, for example, extended reality, virtual reality, and/or augmented reality, has increased significantly in recent years. Input devices, such as cameras, controllers, joysticks, touch-sensitive surfaces, and touch-screen displays for computer systems and other electronic computer devices are used to interact with virtual elements and/or environments. Example virtual elements include virtual objects, such as digital images, video, text, icons, and control elements such as virtual buttons and other graphics. Example computer systems are sometimes worn on the body of the user, such as on the head of the user, on the hands or arms of a user, or on other parts of a user's body.

BRIEF SUMMARY

Some techniques for receiving user information and/or device fit information using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for receiving user information and/or device fit information. Such methods and interfaces optionally complement or replace other methods for receiving user information and/or device fit information. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method comprises: at a computer system that is in communication with one or more display generation components and one or more input devices: receiving, via the one or more input devices, a first set of user inputs corresponding to configuring options for a first item; in response to receiving the first set of inputs, displaying, via the one or more display generation components, a first prompt instructing a user of the computer system to use a first external device separate from the computer system; subsequent to displaying the first prompt, receiving information based on biometric information captured by the first external device; and subsequent to receiving the information based on biometric information captured by the first external device, displaying, via the one or more display generation components, a first set of options corresponding to the first item, wherein the first set of options includes at least a first option that has been selected based on the biometric information captured by the first external device.

In accordance with some embodiments, a non-transitory computer-readable storage medium is described. In some embodiments, the non-transitory computer-readable storage medium stores one or more programs configured to be executed by one or more processors of a computer system that is in communication with one or more display generation components and one or more input devices, the one or more programs including instructions for: receiving, via the one or more input devices, a first set of user inputs corresponding to configuring options for a first item; in response to receiving the first set of inputs, displaying, via the one or more display generation components, a first prompt instructing a user of the computer system to use a first external device separate from the computer system; subsequent to displaying the first prompt, receiving information based on biometric information captured by the first external device; and subsequent to receiving the information based on biometric information captured by the first external device, displaying, via the one or more display generation components, a first set of options corresponding to the first item, wherein the first set of options includes at least a first option that has been selected based on the biometric information captured by the first external device.

In accordance with some embodiments, a transitory computer-readable storage medium is described. In some embodiments, the transitory computer-readable storage medium stores one or more programs configured to be executed by one or more processors of a computer system that is in communication with one or more display generation components and one or more input devices, the one or more programs including instructions for: receiving, via the one or more input devices, a first set of user inputs corresponding to configuring options for a first item; in response to receiving the first set of inputs, displaying, via the one or more display generation components, a first prompt instructing a user of the computer system to use a first external device separate from the computer system; subsequent to displaying the first prompt, receiving information based on biometric information captured by the first external device; and subsequent to receiving the information based on biometric information captured by the first external device, displaying, via the one or more display generation components, a first set of options corresponding to the first item, wherein the first set of options includes at least a first option that has been selected based on the biometric information captured by the first external device.

In accordance with some embodiments, a computer system is described. In some embodiments, the computer system is configured to communicate with one or more display generation components and one or more input devices, and the computer system comprises: one or more processors; and memory storing one or more programs configured to be executed by the one or more processors, the one or more programs including instructions for: receiving, via the one or more input devices, a first set of user inputs corresponding to configuring options for a first item; in response to receiving the first set of inputs, displaying, via the one or more display generation components, a first prompt instructing a user of the computer system to use a first external device separate from the computer system; subsequent to displaying the first prompt, receiving information based on biometric information captured by the first external device; and subsequent to receiving the information based on biometric information captured by the first external device, displaying, via the one or more display generation components, a first set of options corresponding to the first item, wherein the first set of options includes at least a first option that has been selected based on the biometric information captured by the first external device.

In accordance with some embodiments, a computer system is described. In some embodiments, the computer system is configured to communicate with one or more display generation components and one or more input devices, and the computer system comprises: means for receiving, via the one or more input devices, a first set of user inputs corresponding to configuring options for a first item; means for, in response to receiving the first set of inputs, displaying, via the one or more display generation components, a first prompt instructing a user of the computer system to use a first external device separate from the computer system; means for, subsequent to displaying the first prompt, receiving information based on biometric information captured by the first external device; and means for, subsequent to receiving the information based on biometric information captured by the first external device, displaying, via the one or more display generation components, a first set of options corresponding to the first item, wherein the first set of options includes at least a first option that has been selected based on the biometric information captured by the first external device.

In accordance with some embodiments, a computer program product is described. In some embodiments, the computer program product comprises one or more programs configured to be executed by one or more processors of a computer system that is in communication with one or more display generation components and one or more input devices, the one or more programs including instructions for: receiving, via the one or more input devices, a first set of user inputs corresponding to configuring options for a first item; in response to receiving the first set of inputs, displaying, via the one or more display generation components, a first prompt instructing a user of the computer system to use a first external device separate from the computer system; subsequent to displaying the first prompt, receiving information based on biometric information captured by the first external device; and subsequent to receiving the information based on biometric information captured by the first external device, displaying, via the one or more display generation components, a first set of options corresponding to the first item, wherein the first set of options includes at least a first option that has been selected based on the biometric information captured by the first external device.

In accordance with some embodiments, a method is described. The method comprises: at a computer system that is in communication with one or more display generation components and one or more input devices: receiving, via the one or more input devices, device fit information corresponding to information about a head of a person and a first item, wherein: the first item is configurable in a plurality of physical dimension configurations, and the device fit information is indicative of a first physical dimension configuration of the plurality of physical dimension configurations; and providing the device fit information corresponding to the head of the person and the first item to a first external device separate from the computer system.

In accordance with some embodiments, a non-transitory computer-readable storage medium is described. In some embodiments, the non-transitory computer-readable storage medium stores one or more programs configured to be executed by one or more processors of a computer system that is in communication with one or more display generation components and one or more input devices, the one or more programs including instructions for: receiving, via the one or more input devices, device fit information corresponding to information about a head of a person and a first item, wherein: the first item is configurable in a plurality of physical dimension configurations, and the device fit information is indicative of a first physical dimension configuration of the plurality of physical dimension configurations; and providing the device fit information corresponding to the head of the person and the first item to a first external device separate from the computer system.

In accordance with some embodiments, a transitory computer-readable storage medium is described. In some embodiments, the transitory computer-readable storage medium stores one or more programs configured to be executed by one or more processors of a computer system that is in communication with one or more display generation components and one or more input devices, the one or more programs including instructions for: receiving, via the one or more input devices, device fit information corresponding to information about a head of a person and a first item, wherein: the first item is configurable in a plurality of physical dimension configurations, and the device fit information is indicative of a first physical dimension configuration of the plurality of physical dimension configurations; and providing the device fit information corresponding to the head of the person and the first item to a first external device separate from the computer system.

In accordance with some embodiments, a computer system is described. In some embodiments, the computer system is configured to communicate with one or more display generation components and one or more input devices, and the computer system comprises: one or more processors; and memory storing one or more programs configured to be executed by the one or more processors, the one or more programs including instructions for: receiving, via the one or more input devices, device fit information corresponding to information about a head of a person and a first item, wherein: the first item is configurable in a plurality of physical dimension configurations, and the device fit information is indicative of a first physical dimension configuration of the plurality of physical dimension configurations; and providing the device fit information corresponding to the head of the person and the first item to a first external device separate from the computer system.

In accordance with some embodiments, a computer system is described. In some embodiments, the computer system is configured to communicate with one or more display generation components and one or more input devices, and the computer system comprises: means for receiving, via the one or more input devices, device fit information corresponding to information about a head of a person and a first item, wherein: the first item is configurable in a plurality of physical dimension configurations, and the device fit information is indicative of a first physical dimension configuration of the plurality of physical dimension configurations; and means for providing the device fit information corresponding to the head of the person and the first item to a first external device separate from the computer system.

In accordance with some embodiments, a computer program product is described. In some embodiments, the computer program product comprises one or more programs configured to be executed by one or more processors of a computer system that is in communication with one or more display generation components and one or more input devices, the one or more programs including instructions for: receiving, via the one or more input devices, device fit information corresponding to information about a head of a person and a first item, wherein: the first item is configurable in a plurality of physical dimension configurations, and the device fit information is indicative of a first physical dimension configuration of the plurality of physical dimension configurations; and providing the device fit information corresponding to the head of the person and the first item to a first external device separate from the computer system.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for receiving user information and/or device fit information, thereby increasing the effectiveness, efficiency, and user satisfaction with such devices. Such methods and interfaces may complement or replace other methods for receiving user information and/or device fit information.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 8 is a flow diagram illustrating methods of receiving user information and/or device fit information, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for receiving user information and/or device fit information. Such techniques can reduce the cognitive burden on a user who is attempting to determine device fit information for himself or herself, thereby enhancing productivity. Further, such techniques can reduce processor and battery power otherwise wasted on redundant user inputs.

Figure 6A:
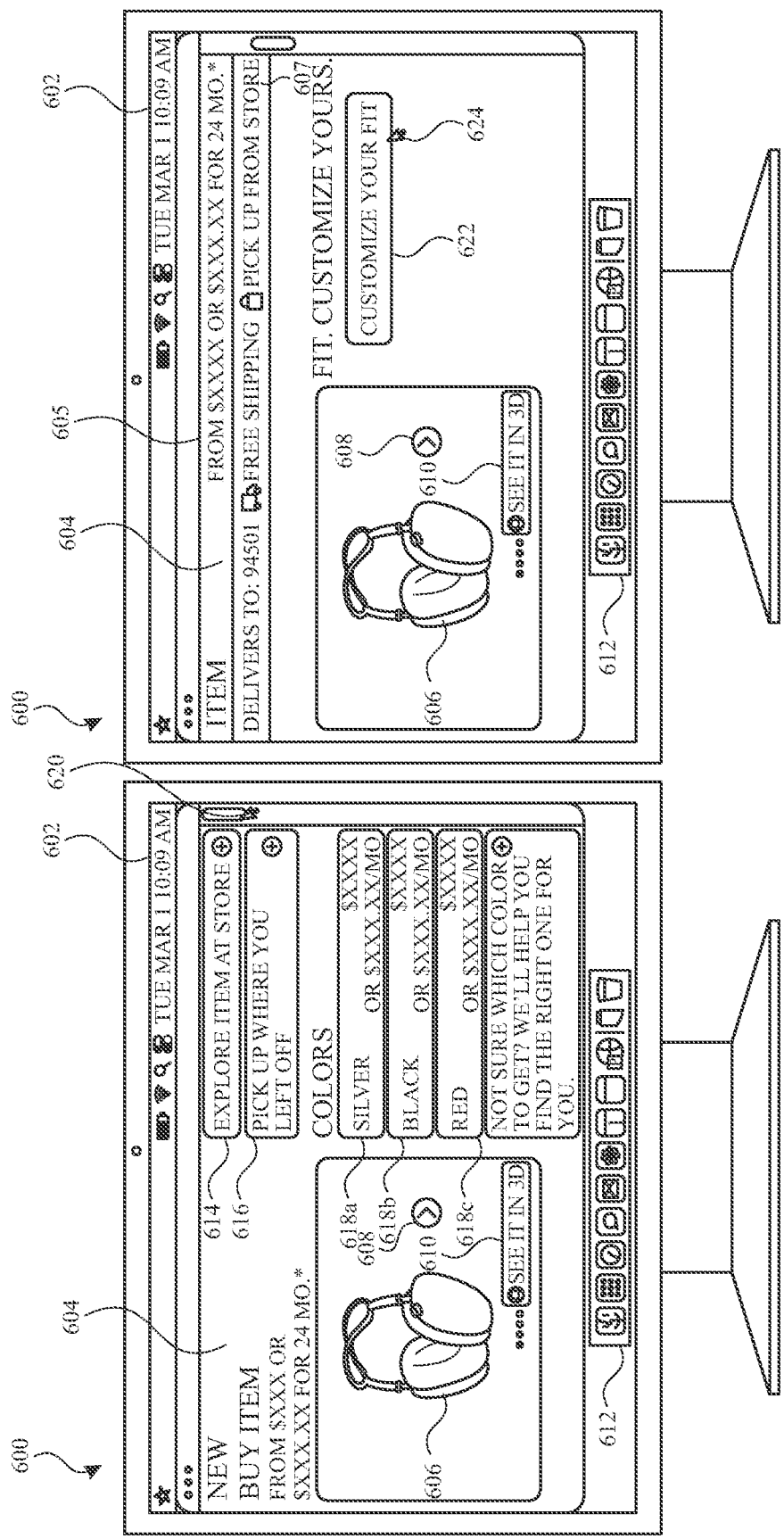
FIGS. 6A-6P illustrate example techniques for receiving user information and/or device fit information, in accordance with some embodiments.
Figure 7:
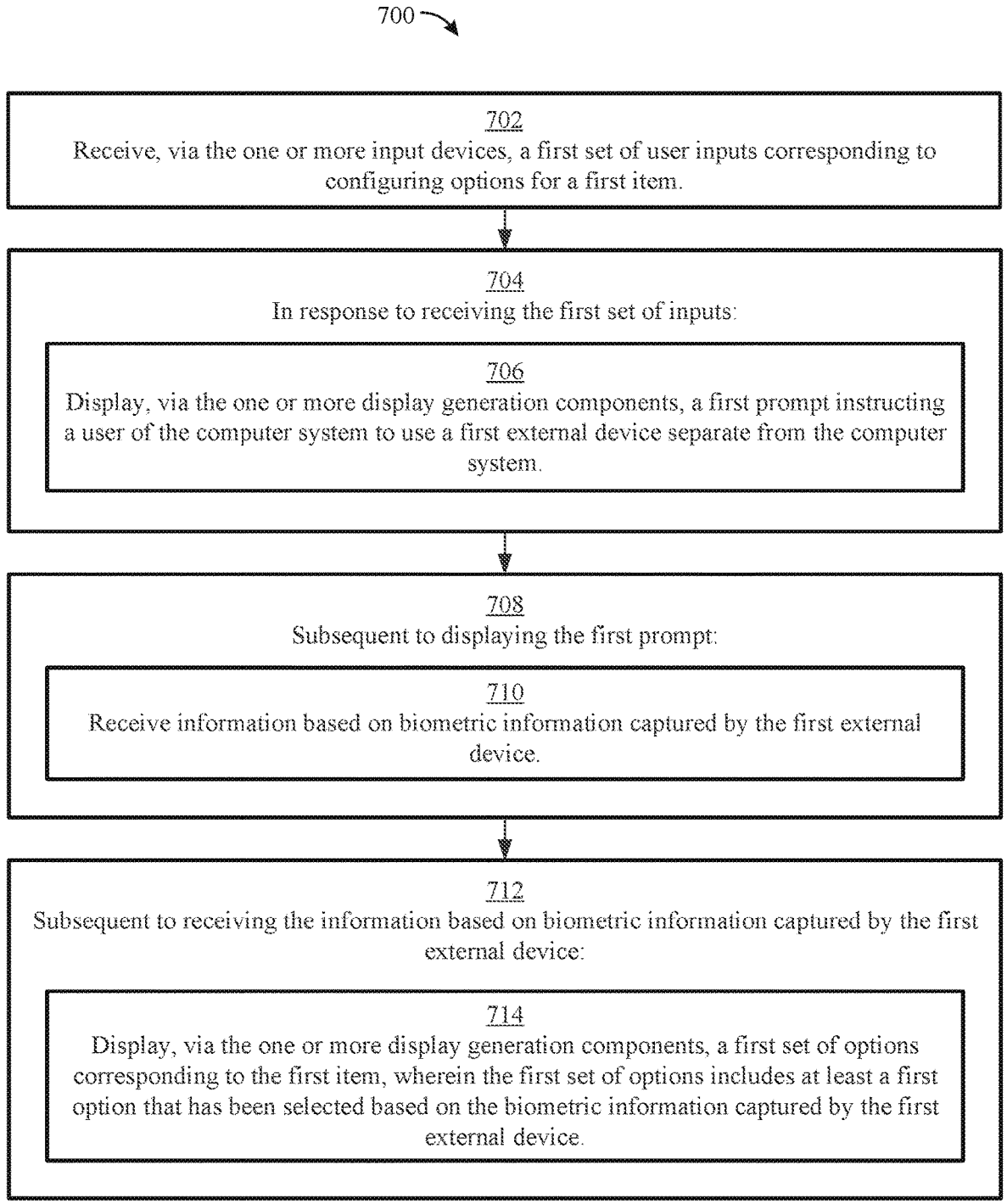
FIG. 7 is a flow diagram illustrating methods of receiving user information and/or device fit information, in accordance with some embodiments.

Below, FIGS. 1A-1B, 2, 3, 4A-4B, and 5A-5B provide a description of exemplary devices for performing the techniques for receiving user information and/or device fit information. FIGS. 5C-5F provide a description of example computer systems for providing XR experiences to users. FIGS. 6A-6P illustrate exemplary user techniques, including exemplary user interfaces, for receiving user information and/or device fit information in accordance with some embodiments. FIG. 7 is a flow diagram illustrating methods of receiving user information and/or device fit information in accordance with some embodiments. FIG. 8 is a flow diagram illustrating methods of receiving user information and/or device fit information in accordance with some embodiments. The user interfaces in FIGS. 6A-6P are used to illustrate the processes described below, including the processes in FIG. 7 and FIG. 8.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
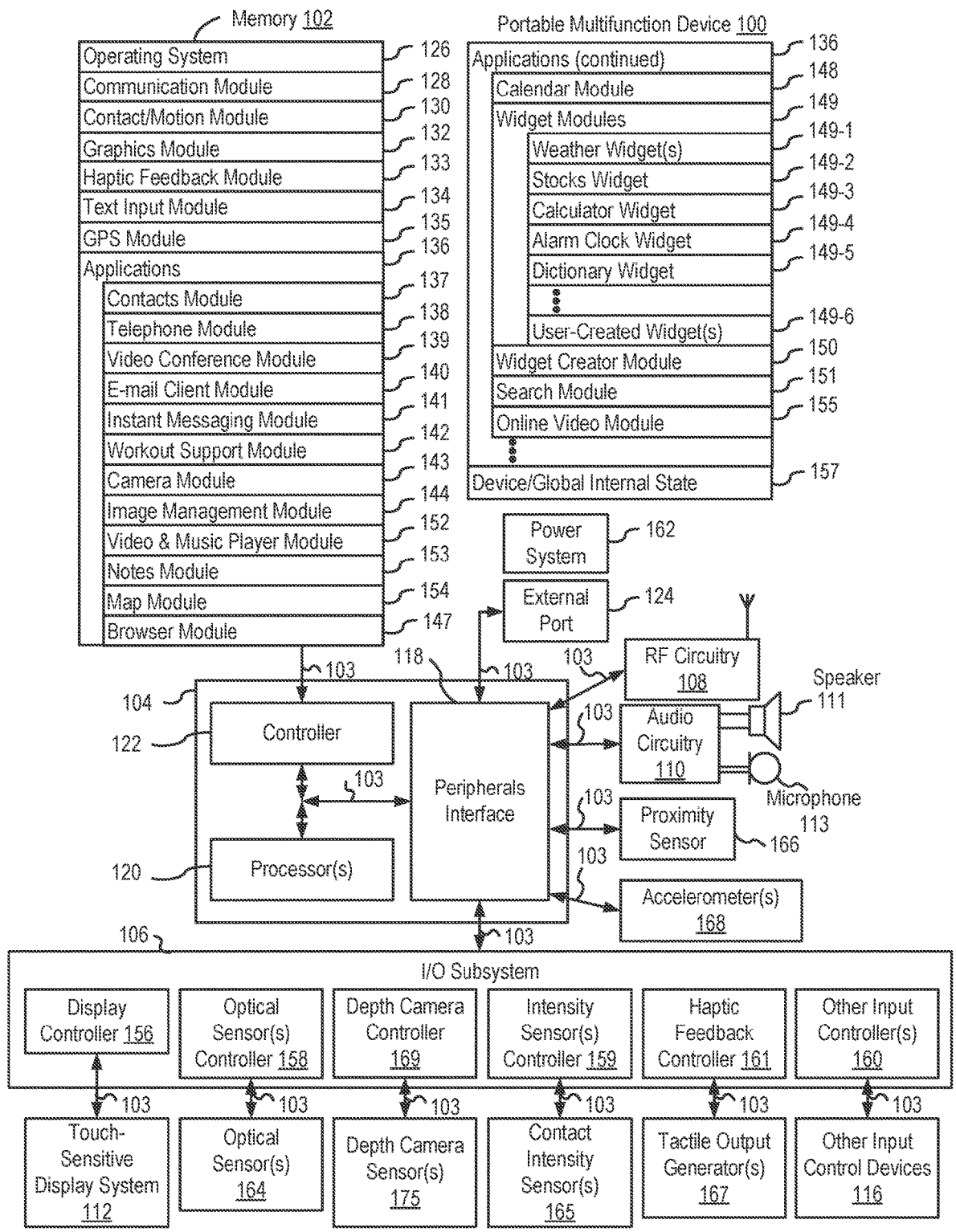
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11 ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser.

No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
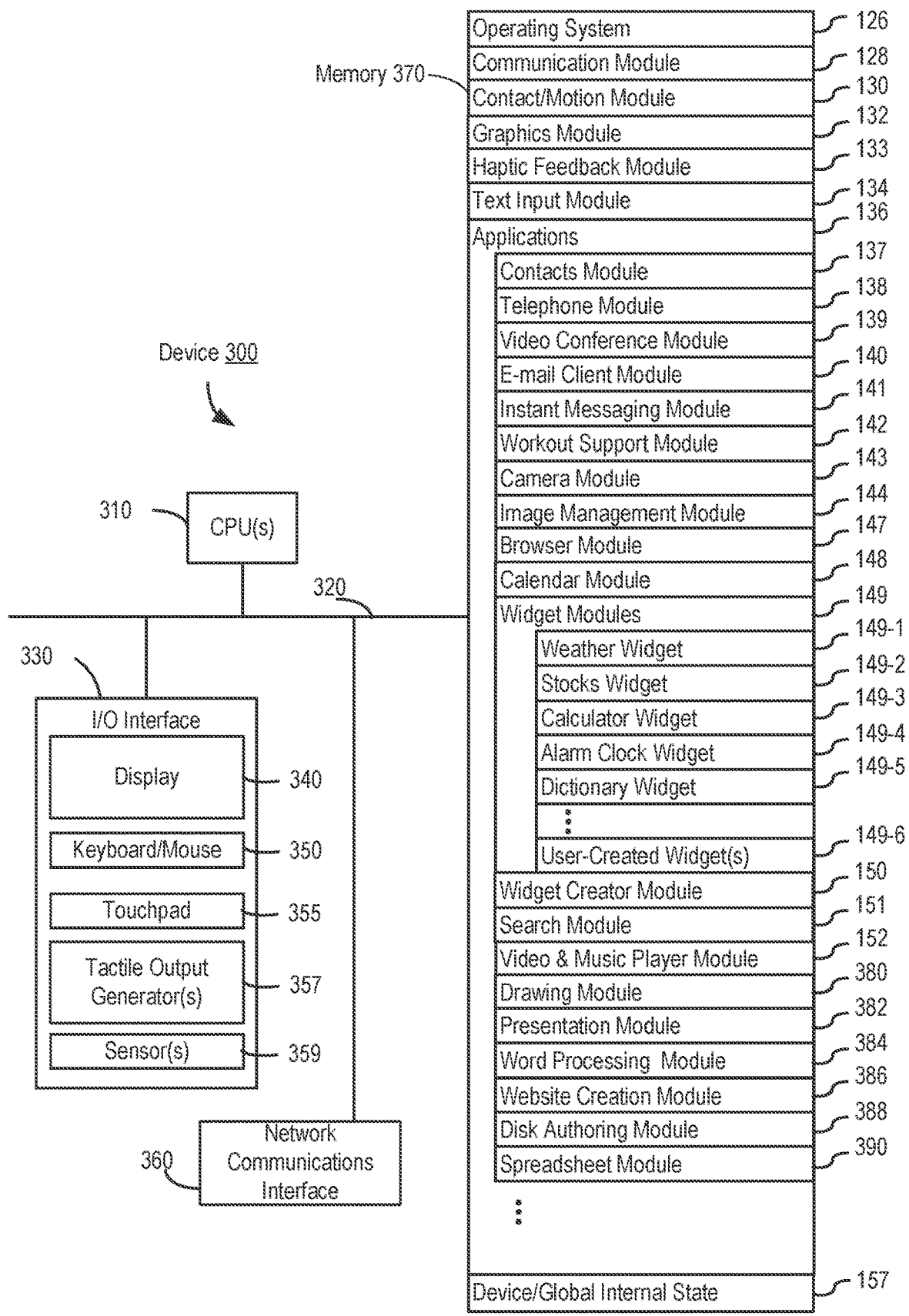
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
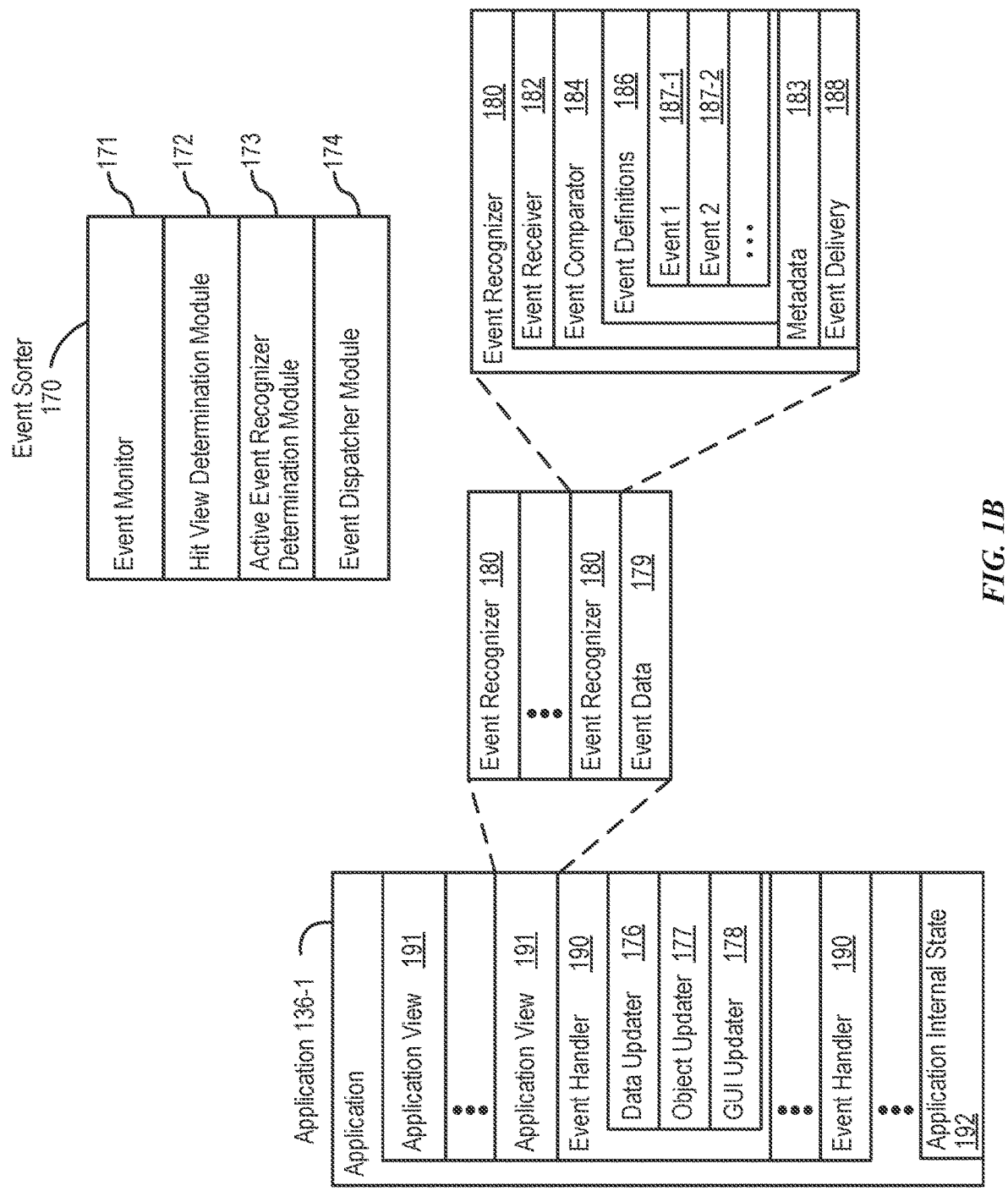
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object.

In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
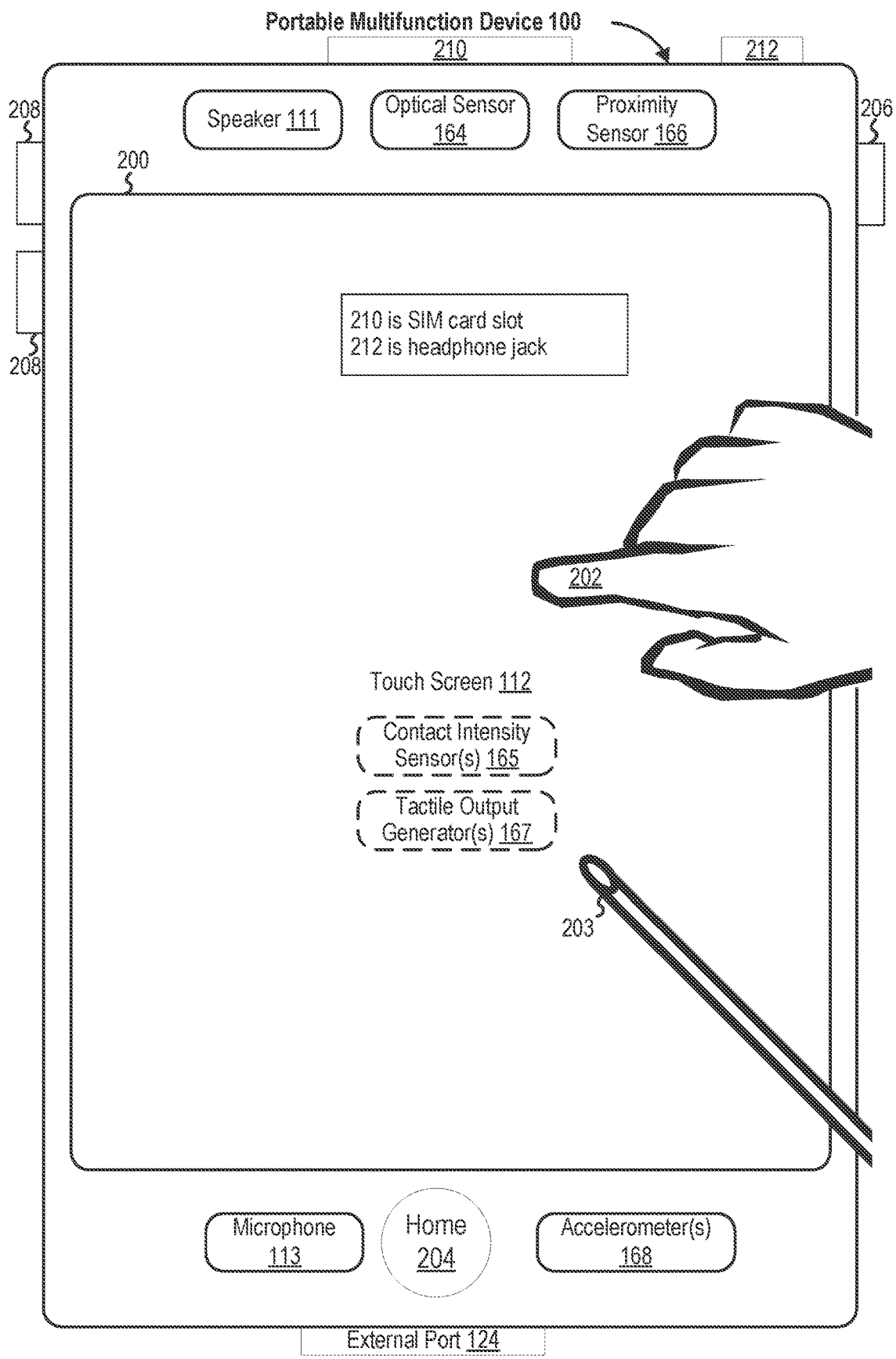
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
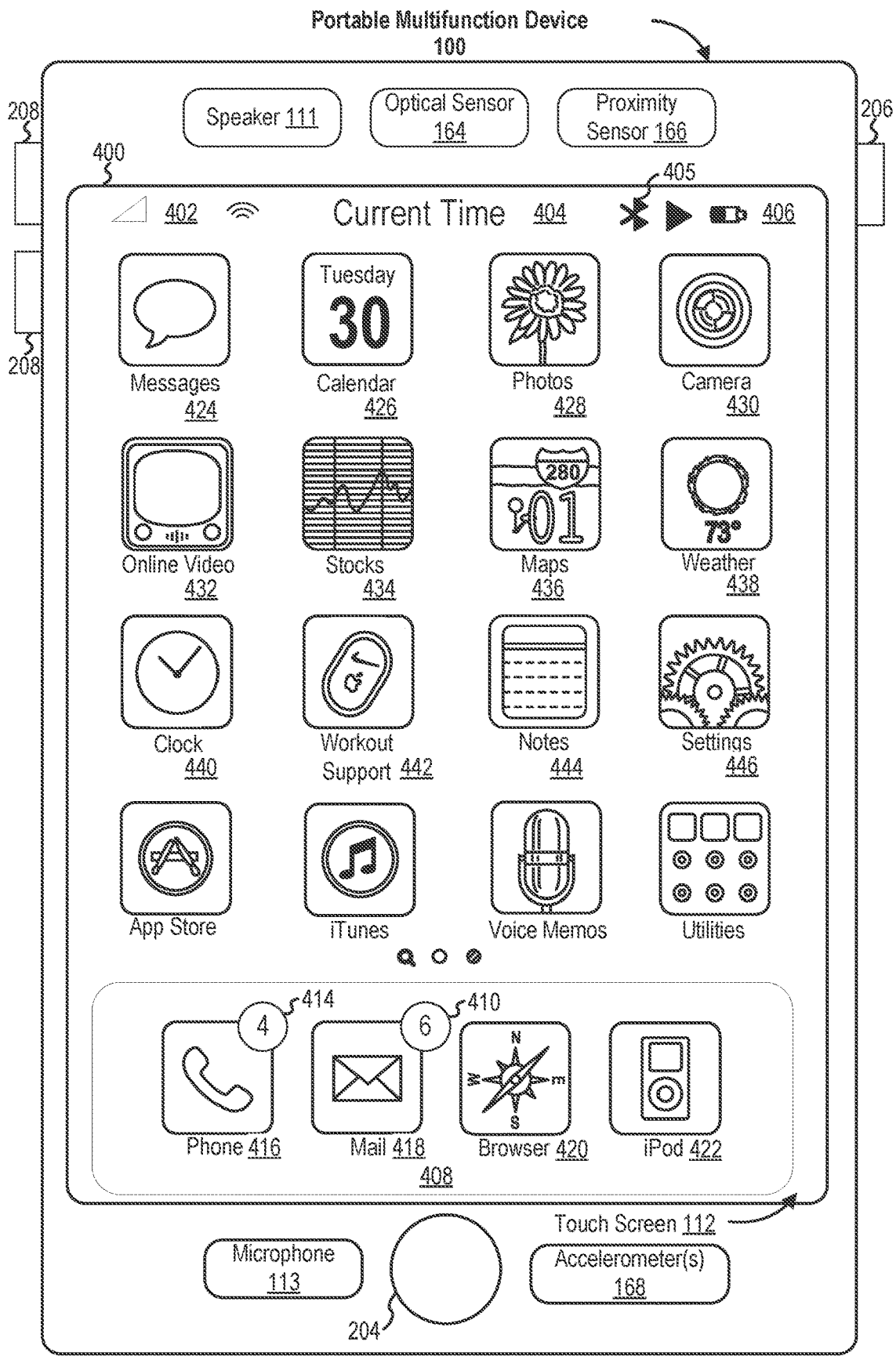
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
- Icon 416 for telephone module 138, labeled "Phone," which optionally includes an indicator 414 of the number of missed calls or voicemail messages;
- Icon 418 for e-mail client module 140, labeled "Mail," which optionally includes an indicator 410 of the number of unread e-mails;
- Icon 420 for browser module 147, labeled "Browser;" and
- Icon 422 for video and music player module 152, also referred to as iPod (trademark of Apple Inc.) module 152, labeled "iPod;" and Icons for other applications, such as:
- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
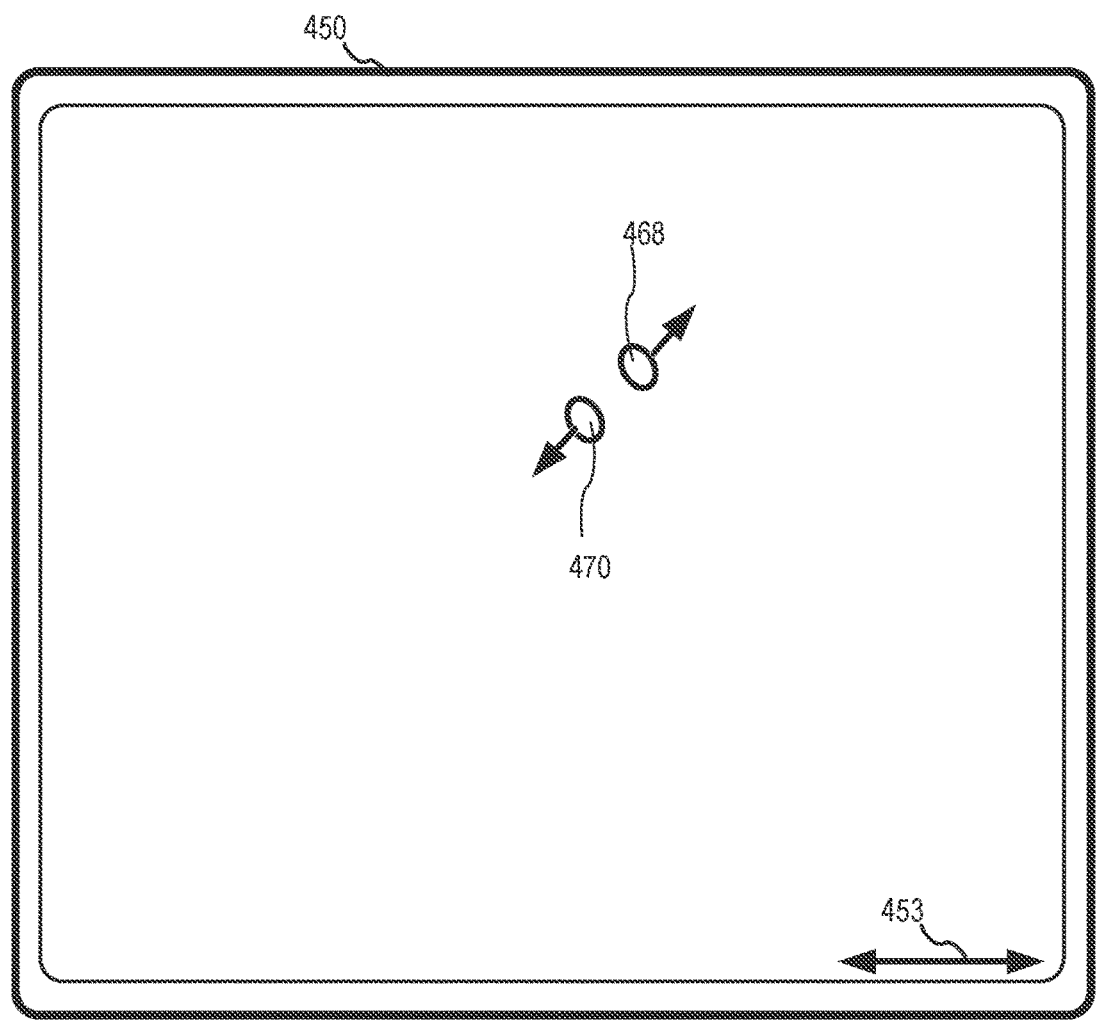
FIG. 4B illustrates an exemplary user interface for a multifunction device with a touch-sensitive surface that is separate from the display in accordance with some embodiments.
Figure 4B:
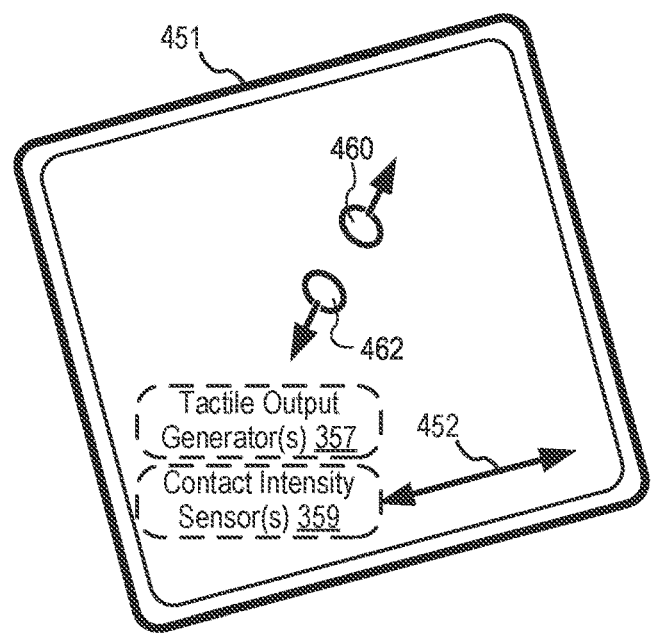

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
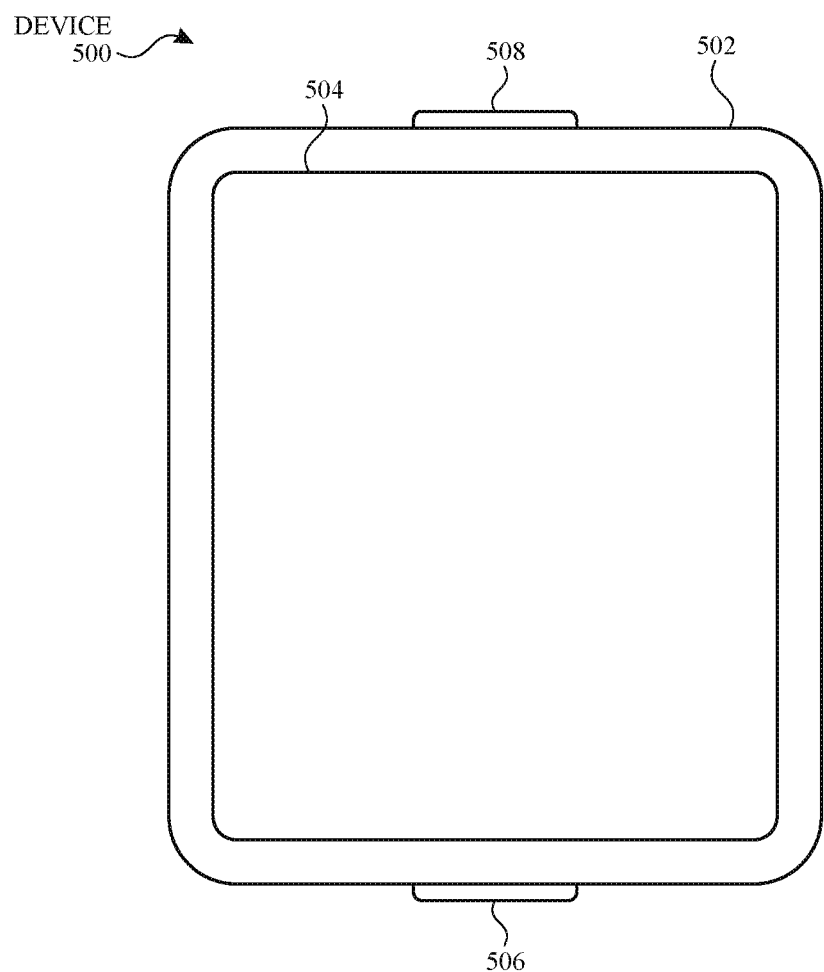
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
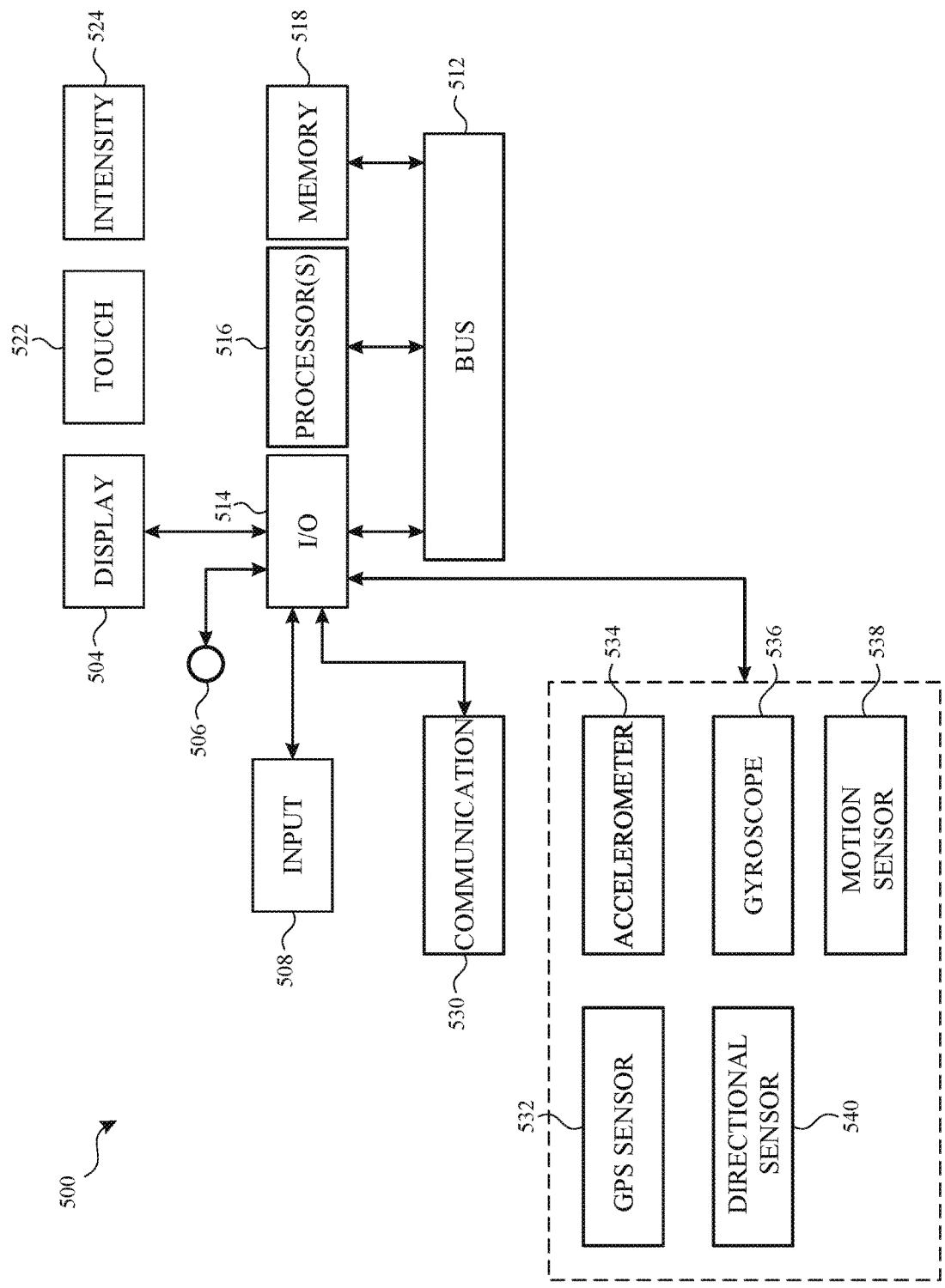
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700-800 (FIGS. 7-8). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, the computer system is in a locked state or an unlocked state. In the locked state, the computer system is powered on and operational but is prevented from performing a predefined set of operations in response to user input. The predefined set of operations optionally includes navigation between user interfaces, activation or deactivation of a predefined set of functions, and activation or deactivation of certain applications. The locked state can be used to prevent unintentional or unauthorized use of some functionality of the computer system or activation or deactivation of some functions on the computer system. In some embodiments, in the unlocked state, the computer system is powered on and operational and is not prevented from performing at least a portion of the predefined set of operations that cannot be performed while in the locked state. When the computer system is in the locked state, the computer system is said to be locked. When the computer system is in the unlocked state, the computer is said to be unlocked. In some embodiments, the computer system in the locked state optionally responds to a limited set of user inputs, including input that corresponds to an attempt to transition the computer system to the unlocked state or input that corresponds to powering the computer system off.

Figure 5C:
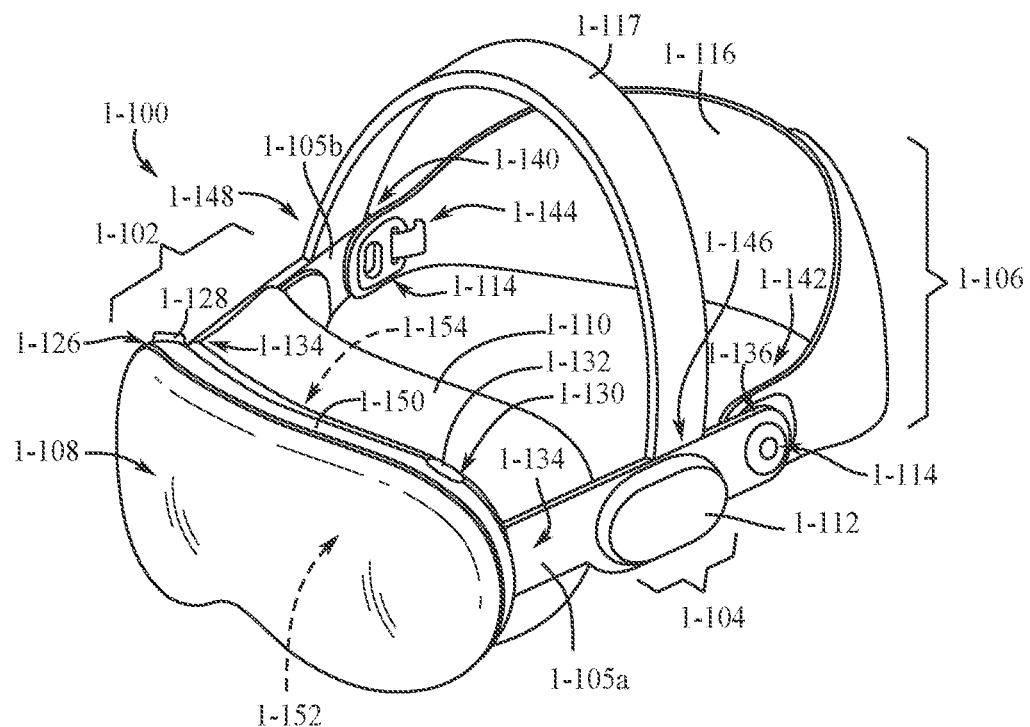
FIGS. 5C-5F are examples of a computer system for providing extended reality (XR) experiences in accordance with some embodiments.

FIG. 5C illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 5C, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 5C because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

Figure 5D:
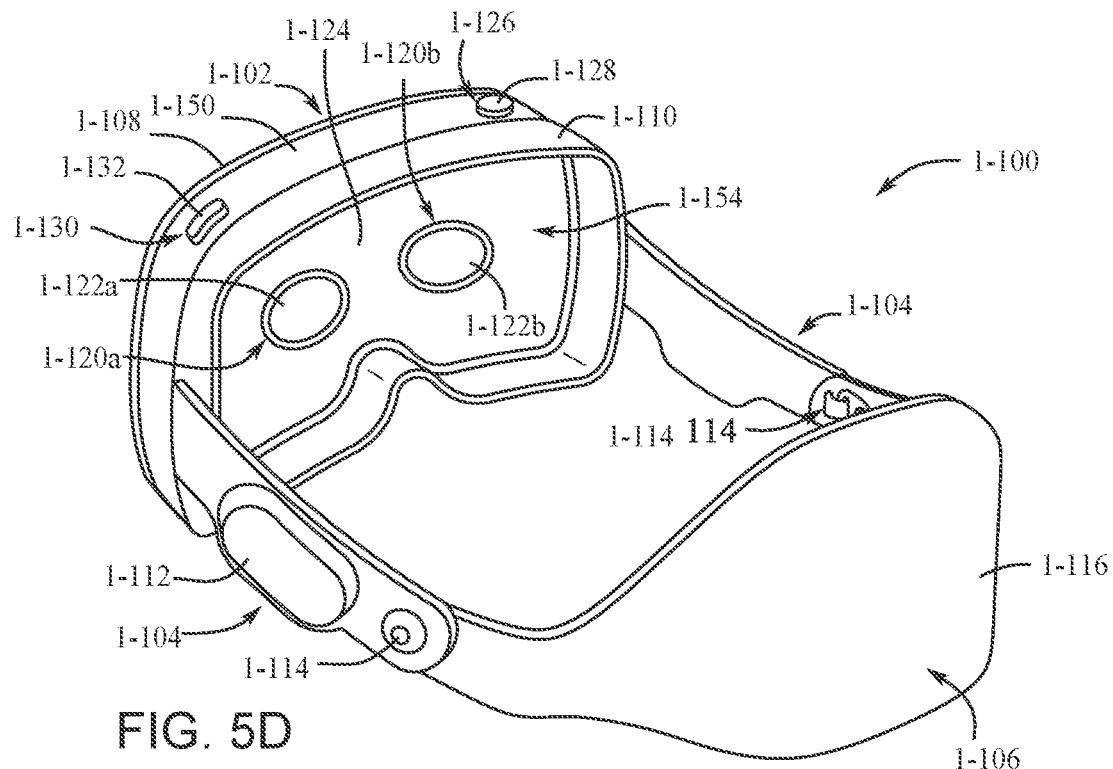

FIG. 5D illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 5C and 5D, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 5C. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Figure 5E:
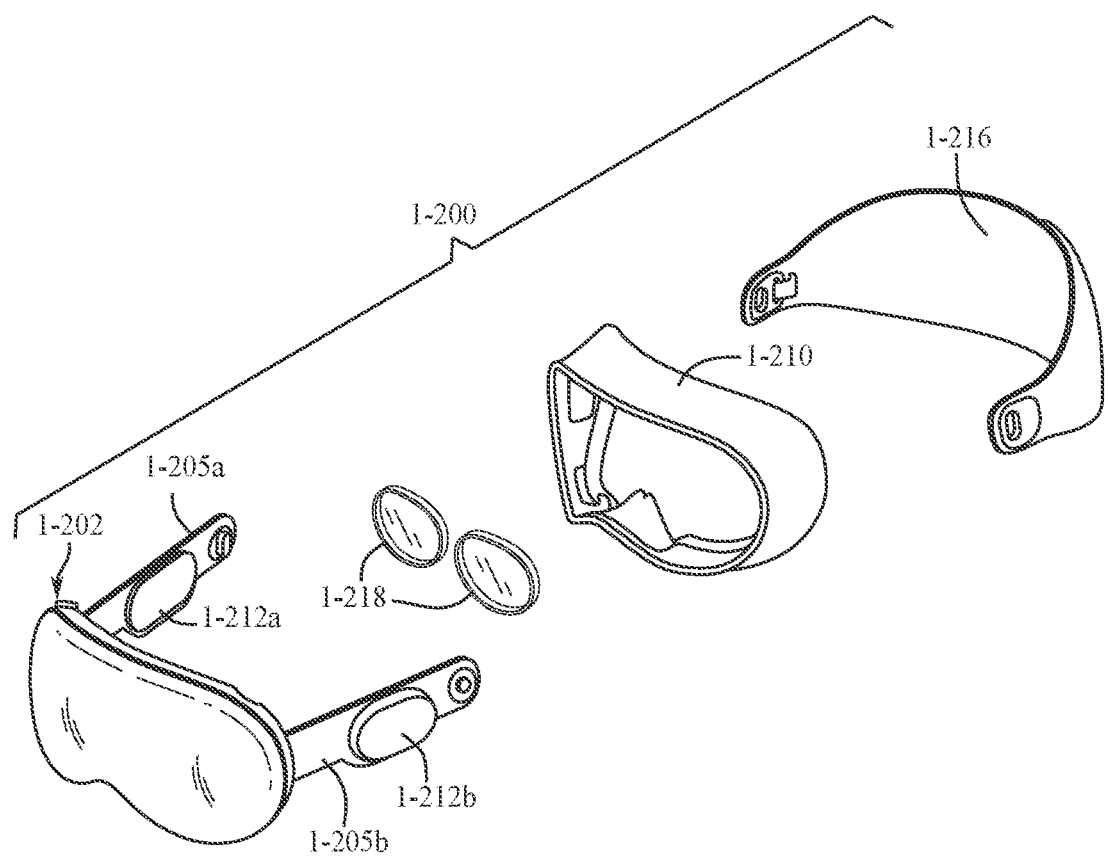

Any of the features, components, and/or parts, including the arrangements and configurations thereof shown in FIGS. 5C and 5D can be included, either alone or in any combination, in any of the other examples of devices, features, components, and parts shown in FIG. 5E and described herein. Likewise, any of the features, components, and/or parts, including the arrangements and configurations thereof shown and described with reference to FIG. 5E can be included, either alone or in any combination, in the example of the devices, features, components, and parts shown in FIGS. 5C and 5D.

FIG. 5E illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 5E can be included, either alone or in any combination, in any of the other examples of devices, features, components, and parts shown in FIGS. 5C and 5D and described herein. Likewise, any of the features, components, and/or parts, including the arrangements and configurations thereof shown and described with reference to FIGS. 5C and 5D can be included, either alone or in any combination, in the example of the devices, features, components, and parts shown in FIG. 5E.

Figure 5F:
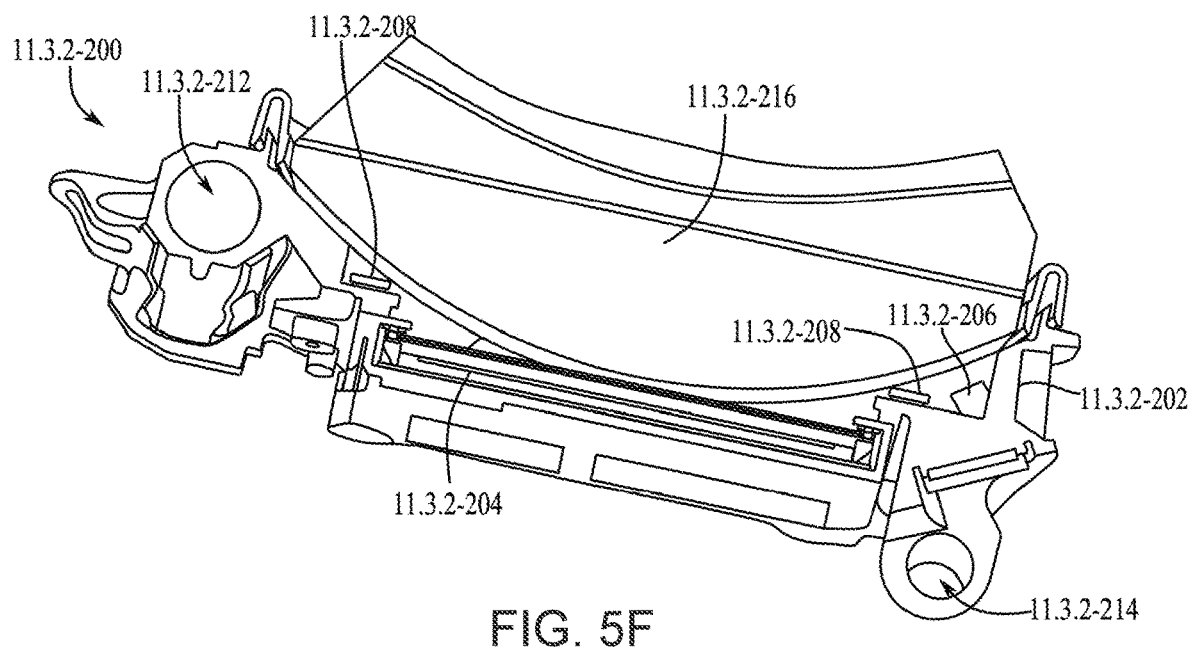

FIG. 5F illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 5F can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 5F.

When describing an XR experience, various terms are used to differentially refer to several related but distinct environments that the user may sense and/or with which a user may interact (e.g., with inputs detected by a computer system generating the XR experience that cause the computer system generating the XR experience to generate audio, visual, and/or tactile feedback corresponding to various inputs provided to the computer system). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Attention is now directed towards embodiments of user interfaces ("UI") and associated processes that are implemented on an electronic device, such as portable multifunction device 100, device 300, or device 500.

FIGS. 6A-6P illustrate exemplary user interfaces for receiving user information and/or device fit information, in accordance with some embodiments. The user interfaces in these figures are used to illustrate the processes described below, including the processes in FIG. 7 and FIG. 8.

FIG. 6A illustrates computer system 600 that includes display 602. In the depicted embodiments, computer system 600 is a desktop computer system that is in communication with one or more input devices, such as a mouse, keyboard, and/or trackpad. In different embodiments, computer system 600 is a different device, such as a smart phone, a tablet, a laptop computer, a smart watch, a wearable device, and/or a head-mounted system. In FIG. 6A, computer system 600 displays, via display 602, user interface 604 for ordering (e.g., purchasing) and/or configuring an item, item 606. User interface 604 includes various selectable options corresponding to item 606 that is being configured and/or ordered (e.g., for purchase) by a user. For example, in FIG. 6A, user interface 604 includes various color options 618a-618c that are each selectable by a user to order a particular color of item 606. User interface 604 also includes option 608 that is selectable to view additional views (e.g., additional images and/or videos) of item 606, and option 610 that is selectable to view a three-dimensional rendering and/or representation of item 606. In FIG. 6A, user interface 604 is displayed within a web browser, and is displayed concurrently with a system user interface (e.g., an operating system user interface) that includes application dock 612.

In the depicted embodiments, item 606 is a set of headphones that is customizable and/or configurable by a user. In different embodiments, the item being ordered and/or configured is a different item. For example, in some embodiments, the item (e.g., item 606) is a head-mounted device (HMD) and/or a head-mounted computer system for providing extended reality (XR) experiences, such as mixed-reality (MR), augmented-reality (AR), and/or virtual reality (VR) experiences. In some embodiments, a head-mounted device includes speakers and/or other audio output devices integrated into the head-mounted device for providing audio output. A head-mounted device may have one or more speaker(s) and an integrated opaque display. Alternatively, a head-mounted device may be configured to accept an external opaque display (e.g., a smartphone). The head-mounted device may incorporate one or more imaging sensors to capture images or video of the physical environment, and/or one or more microphones to capture audio of the physical environment. Rather than an opaque display, a head-mounted device may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, one or more XR displays of the head-mounted system are configured to provide an XR experience to a user. In some embodiments, the one or more XR displays correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays correspond to diffractive, reflective, polarized, holographic, etc. waveguide displays. In some embodiments, the head-mounted device includes a single XR display. In some embodiments, the head-mounted device includes two XR displays, one for each eye of the user. In some embodiments, the one or more XR displays are capable of presenting MR and VR content. In some embodiments, the one or more XR displays are capable of presenting MR or VR content.

In some embodiments, as will be described in greater detail below, item 606 includes one or more characteristics and/or components that are customizable based on one or more biometric features of a user, such as the size and/or shape of a part of the user's body (e.g., the user's head, the user's face, the user's torso, the user's arms, and/or the user's legs). For example, in some embodiments in which the item is a head-mounted computer system, the item includes one or more characteristics and/or components that are customizable based on the size and/or shape of the user's head and/or based on the size, shape, and/or positioning of one or more facial features of the user. Such features will be described in greater detail below with reference to later figures.

In FIG. 6A, user interface 604 includes option 614 that is selectable to initiate a process for creating an appointment to view item 606 within a physical retail store. User interface 604 also includes option 616 that is selectable to load and/or recall a previous set of options and/or selections made by the user with respect to item 606. For example, in some embodiments, a user may have previously visited user interface 604 and made one or more selections for item 606, and saved those selections (e.g., to a user account associated with the user). The user can select option 616 to load and/or recall those previously made selections. At FIG. 6A, computer system 600 detects user input 620, which is a mouse click and drag input corresponding to a request to scroll lower in user interface 604.

At FIG. 6B1, in response to detecting user input 620, computer system 600 scrolls user interface 604 to display additional option 622 corresponding to item 606. As discussed above, in some embodiments, item 606 includes one or more features, characteristics, and/or components that are customizable based on one or more biometric features of a user. Option 622 is selectable to initiate a process for capturing biometric information pertaining to the user in order to select the appropriate customizable options for the user based on the user's biometric information. In FIG. 6B1, user interface 604 also includes price indication 605, which displays the price of item 606 based on the configuration options that have been selected by the user. At FIG. 6B1, computer system 600 detects user input 624 which, in the depicted embodiments, is a mouse click input corresponding to selection of option 622.

In some embodiments, the techniques and user interface(s) described in FIGS. 6A-6B1, 6C-6L1, and 6M-6P are used to order and/or configure a computer system, such as a computer system illustrated in FIGS. 5C-5F. For example, FIG. 6B2 illustrates an embodiment in which computer system 600 displays user interface 604 to order and/or configure item X606.

At FIG. 6B2, in response to detecting user input 620, computer system 600 scrolls user interface 604 to display additional option 622 corresponding to item X606. In some embodiments, item X606 includes one or more features, characteristics, and/or components that are customizable based on one or more biometric features of a user. In some embodiments, item X606 corresponds to a computer system, such as a head-mounted device, for providing extended reality (XR) experiences. In some embodiments, item X606 corresponds to a computer system that includes any of the features, components, and/or parts of HMD 1-100, HMD 1-200, and/or HMD 11.3.2-200 illustrated in FIGS. 5C-5F. Option 622 is selectable to initiate a process for capturing biometric information pertaining to the user in order to select the appropriate customizable options for the user based on the user's biometric information. In FIG. 6B2, user interface 604 also includes price indication 605, which displays the price of item X606 based on the configuration options that have been selected by the user. At FIG. 6B2, computer system 600 detects user input 624 which, in the depicted embodiments, is a mouse click input corresponding to selection of option 622.

Any of the features, components, and/or parts, including the arrangements and configurations thereof shown in FIGS. 5C-5F can be included, either alone or in any combination, in item X606. For example, in some embodiments, item X606 includes any of the features, components, and/or parts of HMD 1-100 and/or 1-200, either alone or in any combination. In some embodiments, item X606 includes any of the features, components, and/or parts of display unit 1-102, display unit 1-202, display screens 1-122a-b, first and second display assemblies 1-120a, 1-120b, display assembly 11.3.2-204, and/or optical module 11.3.2-200, either alone or in any combination. In some embodiments, item X606 includes a sensor. In some embodiments, item X606 includes any of the features, components, and/or parts of any of first button 1-128 and/or second button 1-132, either alone or in any combination. In some embodiments, item X606 includes one or more audio output components (e.g., electronic component 1-112) for generating audio feedback (e.g., audio output), optionally generated based on detected events and/or user inputs detected by the item X606.

Figure 6C:
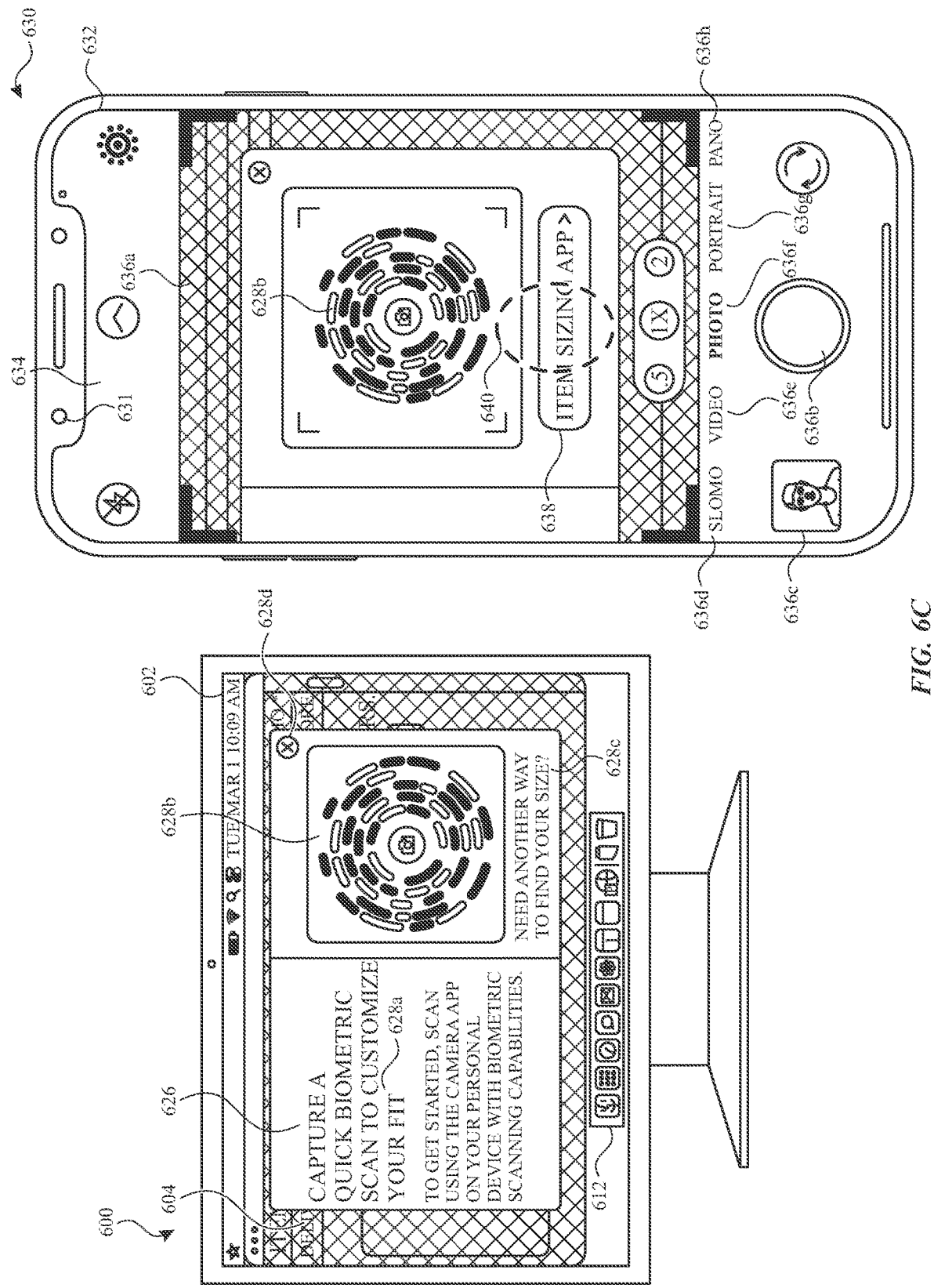

At FIG. 6C, in response to detecting user input 624, computer system 600 displays user interface 626. In FIG. 6C, user interface 626 is displayed partially overlaying user interface 604. In the depicted embodiments, computer system 600 does not include one or more sensors that are needed to collect the biometric information from the user that is to be used in selecting one or more options for item 606. Accordingly, user interface 626 includes instructions 628a which instruct the user to use a different device (e.g., the user's "personal device with biometric scanning capabilities) in order to collect this biometric information. User interface 626 also includes QR code 628b. Instructions 628a instruct the user to scan QR code 628b using a device that includes biometric scanning capabilities (e.g., includes one or more sensors that can be used to collect the required biometric information from the user for customizing item 606). User interface 626 also includes option 628c that is selectable to collect the user's biometric information in a different way (e.g., by visiting a physical store location to measure and/or collect the user's biometric information), and option 628d, that is selectable to close and/or cease display of user interface 626.

FIG. 6C also depicts computer system 630, which is a smartphone with touch-sensitive display 632. Computer system 630 includes sensors 631 that are not included in computer system 600, and are capable of collecting biometric information from the user (e.g., in some embodiments, one or more face scanners and/or one or more eye scanners). Computer system 630 displays camera user interface 634, which includes viewfinder portion 636a, shutter button 636b, and options 636c-636h. Viewfinder portion 636a displays visual content being received via a camera of computer system 630, and shutter button 636b is selectable to capture and/or record visual content (e.g., capture an image and/or capture a video). Option 636c is selectable to display a photo library user interface (e.g., with one or more photos and/or videos stored on computer system 630 and/or accessible by computer system 630). Options 636d-636h are selectable to switch between different camera modes (e.g., a slow motion video mode, a video mode, a photo mode, a portrait photo mode, and/or a panoramic photo mode). In FIG. 6C, a camera of computer system 630 is pointed at computer system 600, and viewfinder area 636a displays QR code 628b. In response to viewfinder area 636a displaying QR code 628b, and/or in response to a camera of computer system 630 receiving visual information corresponding to QR code 628b, computer system 630 displays option 638 corresponding to QR code 628b. Option 638 is selectable to open an item sizing app clip. In some embodiments, an app clip is associated with an application, but is usable without downloading and/or installing the full application. At FIG. 6C, computer system 630 detects user input 640, which is a tap input via touch-screen display 632 corresponding to selection of option 638.

Figure 6D:
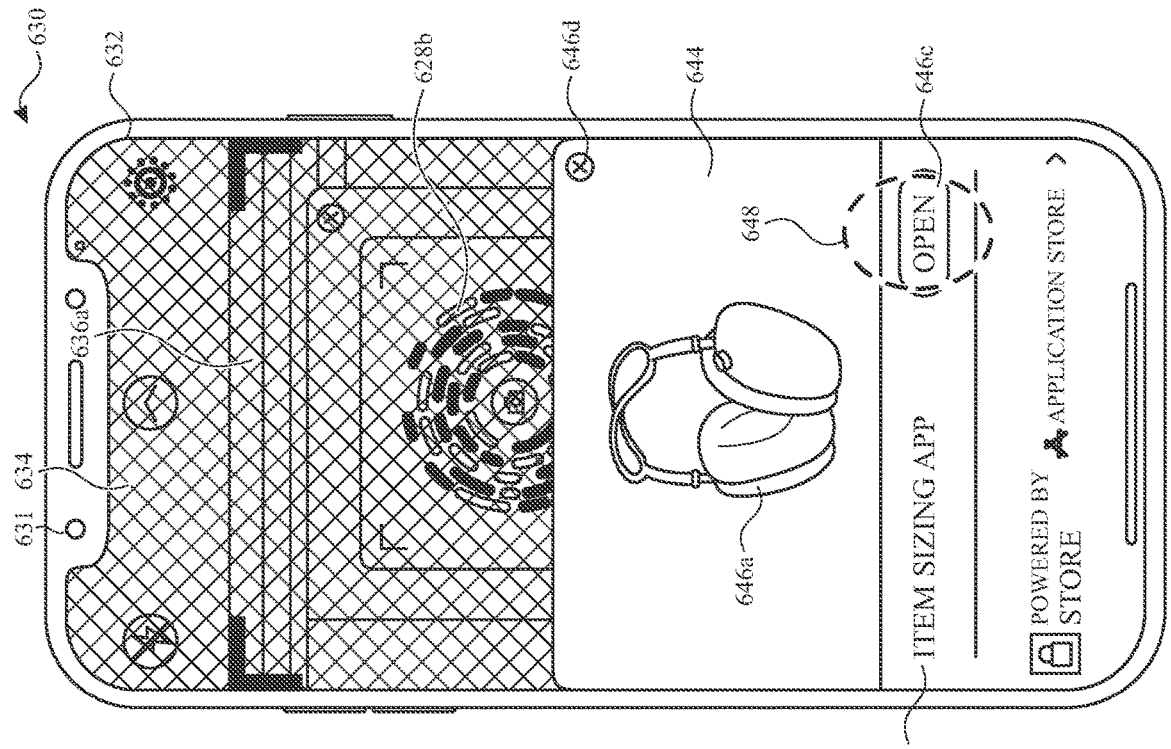
Figure 6D:
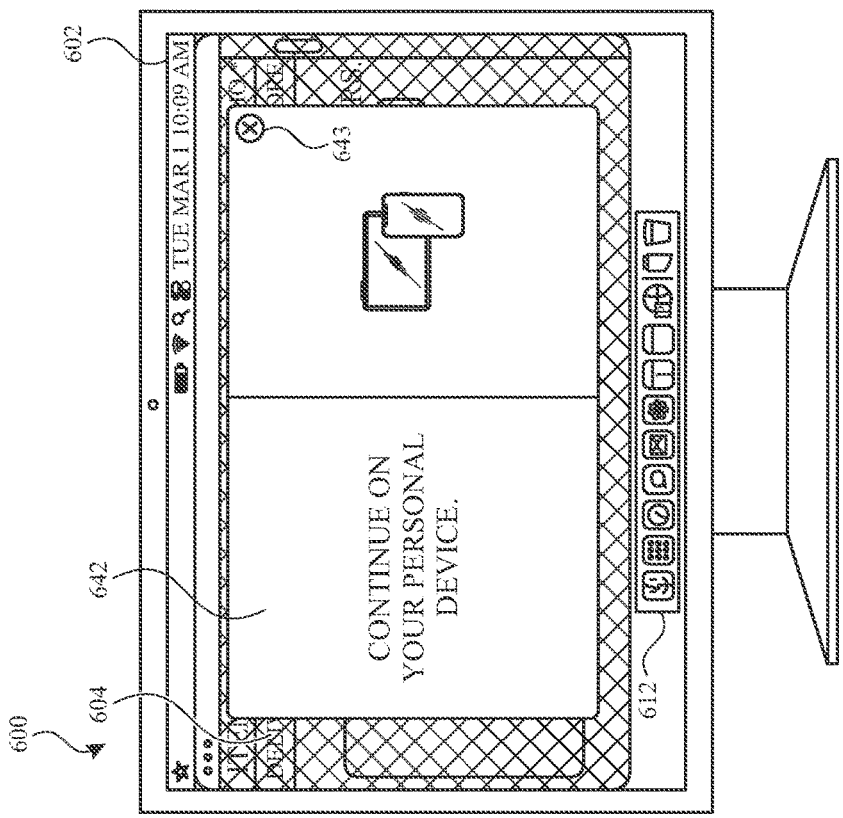

At FIG. 6D, in response to detecting user input 640, computer system 630 displays user interface 644 corresponding to an item sizing app clip. In the depicted embodiment, user interface 644 partially overlays camera user interface 634. User interface 644 includes visual representation 646a which is representation of item 606, text 646b which identifies the item sizing app clip, option 646c that is selectable to open the item sizing app clip, and option 646d that is selectable to close and/or cease display of user interface 644. Furthermore, in response to a determination that the user has scanned QR code 628b using computer system 630 (e.g., based on a communication and/or indication from computer system 630), computer system 600 displays user interface 642 which instructs the user to continue the item sizing process on his or her personal device (e.g., computer system 630). User interface 642 includes option 643 that is selectable to close and/or cease display of user interface 642. At FIG. 6D, computer system 630 detects user input 648, which is a tap input corresponding to selection of option 646c.

Figure 6E:
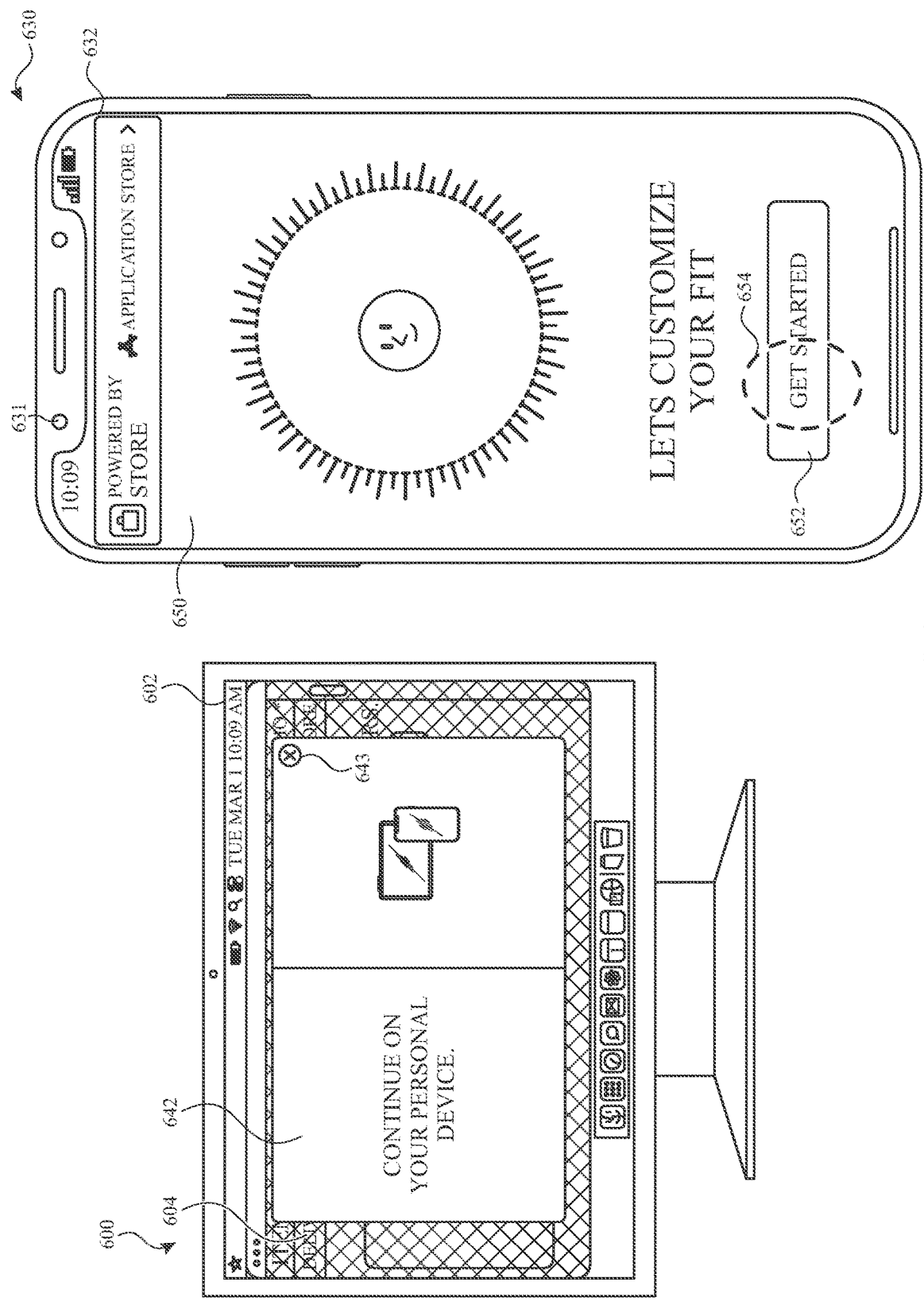

At FIG. 6E, in response to detecting user input 648, computer system 630 ceases display of user interface 644, and displays user interface 650, which corresponds to (e.g., is generated by and/or displayed by) the item sizing app clip. User interface 650 corresponds to a biometric information collection process, and provides the user with instructions for collecting biometric information to be used in configuring item 606 (e.g., selecting one or more options for item 606). In FIG. 6E, user interface 650 includes option 652 that is selectable to begin collecting biometric information from the user. At FIG. 6E, computer system 630 detects user input 654, which is a tap input corresponding to selection of option 652.

Figure 6F:
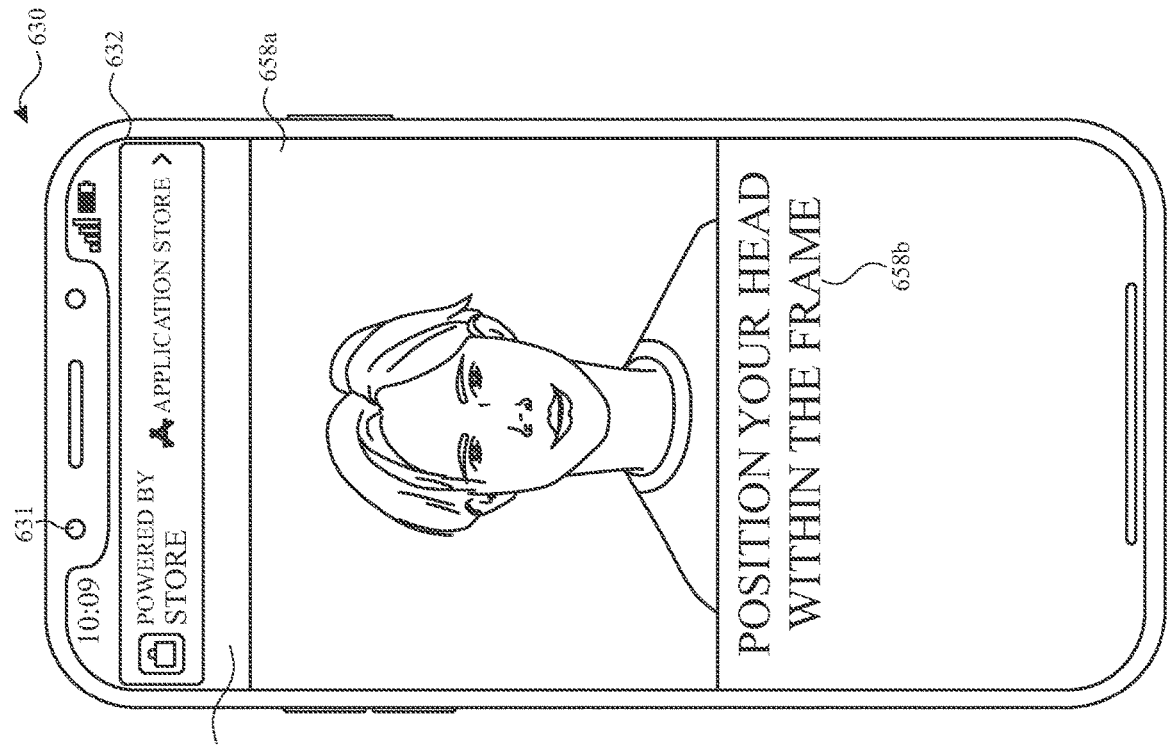
Figure 6F:
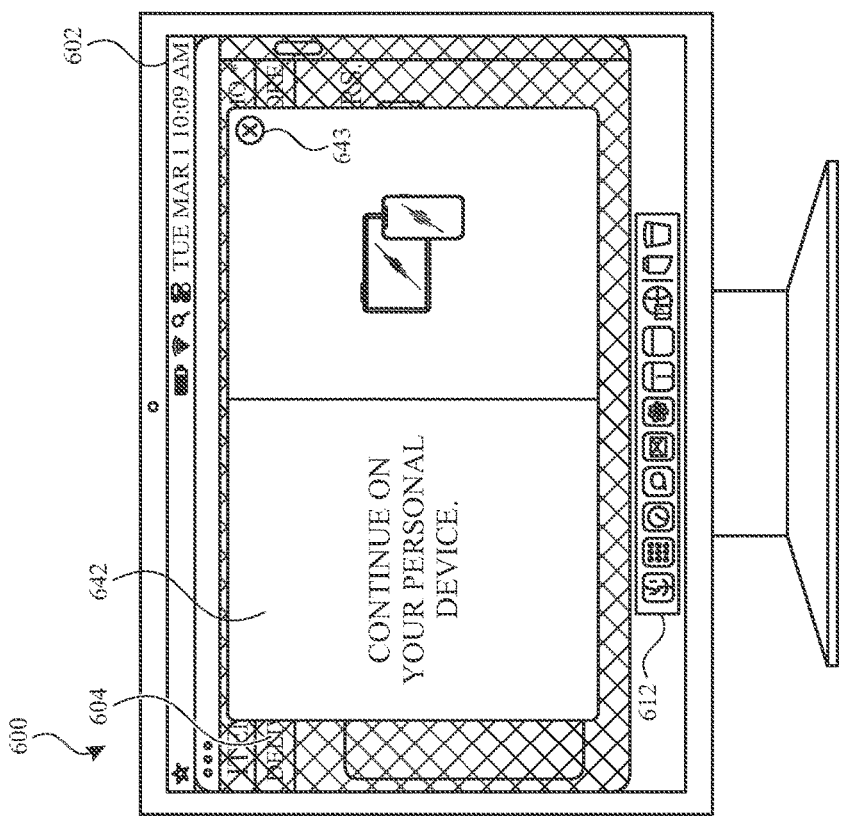

At FIG. 6F, in response to detecting user input 654, computer system 630 displays user interface 656. User interface 656 includes viewfinder portion 658, which displays visual information being received by one or more cameras of computer system 630 (e.g., one or more cameras that are part of sensors 631). User interface 656 also includes an instruction for the user to position his or her head such that the user's head is visible within viewfinder portion 658a.

Figure 6G:
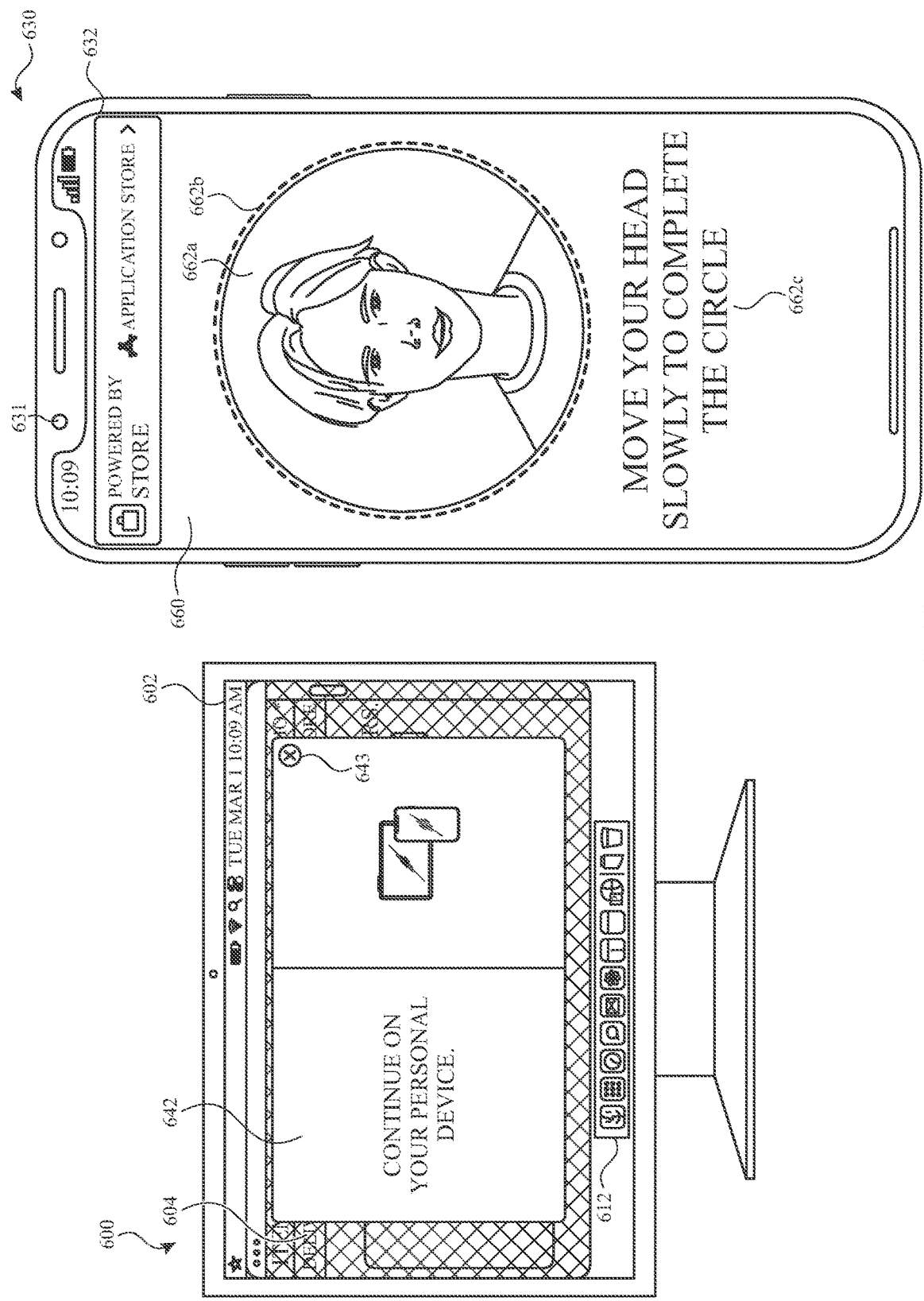

At FIG. 6G, computer system 630 detects that the user's head is positioned such that it is visible within viewfinder portion 658a. In response to the determination that the user's head is positioned such that it is visible within viewfinder portion 658a, computer system 630 displays user interface 660. User interface 660 includes viewfinder portion 662a, which continues to display visual information being received by one or more cameras of computer system 630 (e.g., one or more cameras that are part of sensors 631) and, in FIG. 6G, displays the user's face. User interface 660 also includes progress indication 662b, which indicates the how much of the biometric information collection process has been completed, as well as instruction 662c, which instructs the user to move his or her head slowly to complete the circle (e.g., progress indication 662b).

Figure 6H:
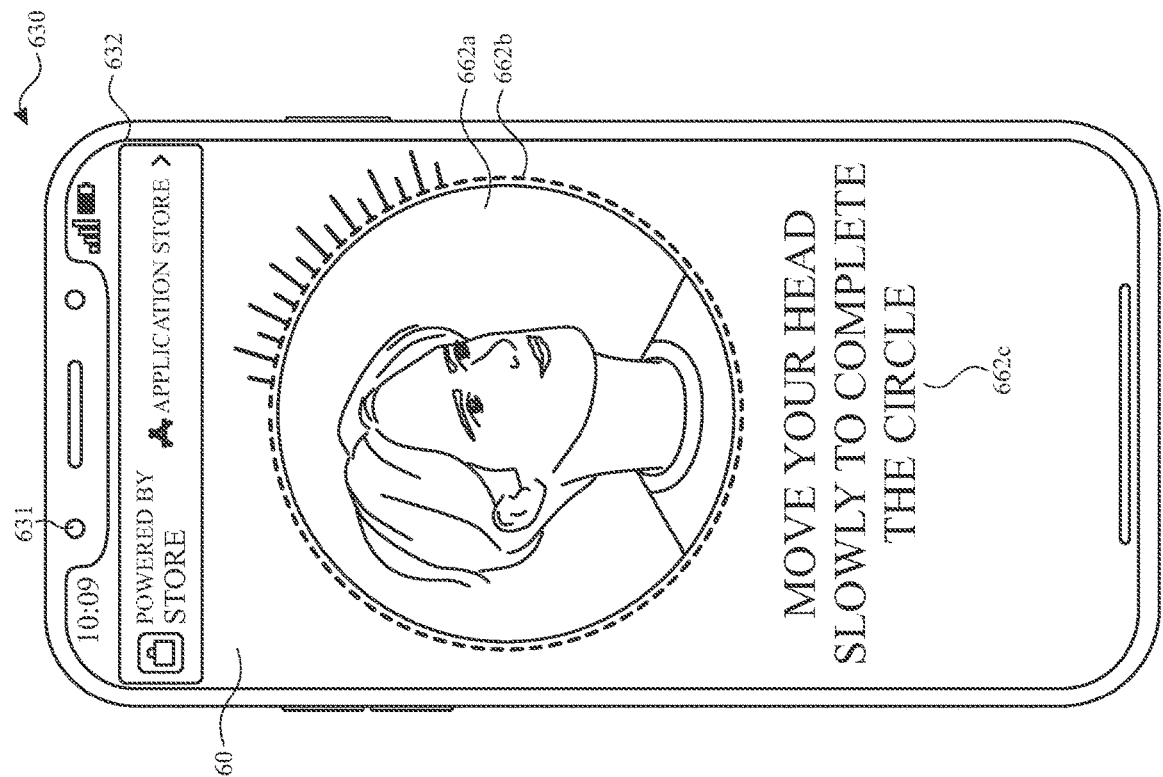
Figure 6H:
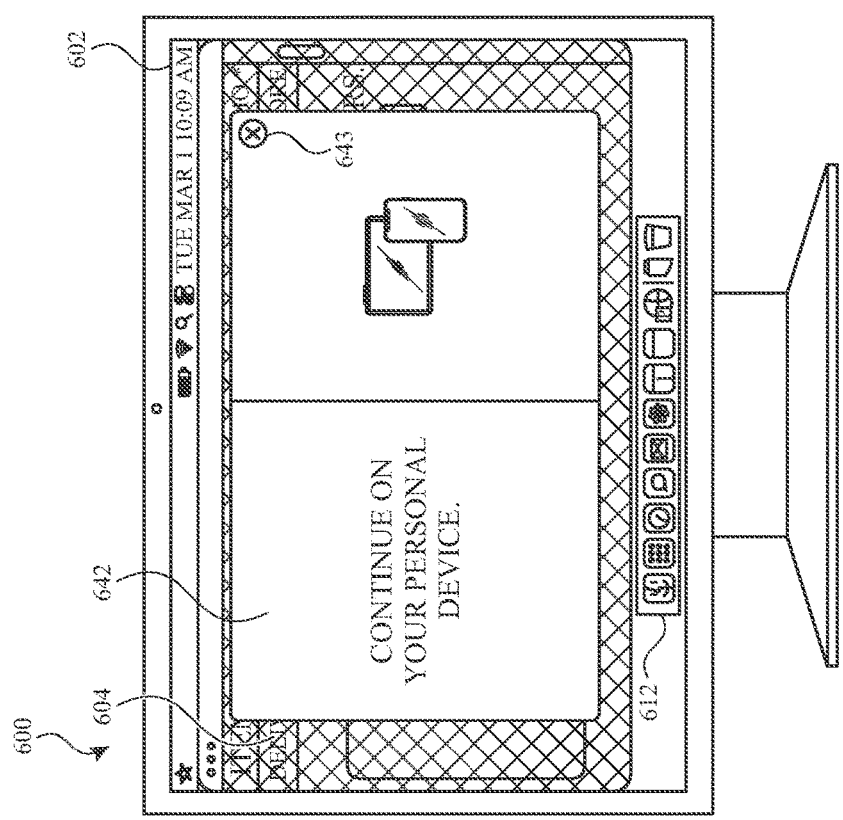

At FIG. 6H, computer system 630 detects that the user has moved his or her head. In response to detecting that the user has moved his or her head, computer system 630 updates progress indication 662b to show that a first set of biometric information has been collected and the biometric information collection process has progressed and been partially completed.

Figure 6I:
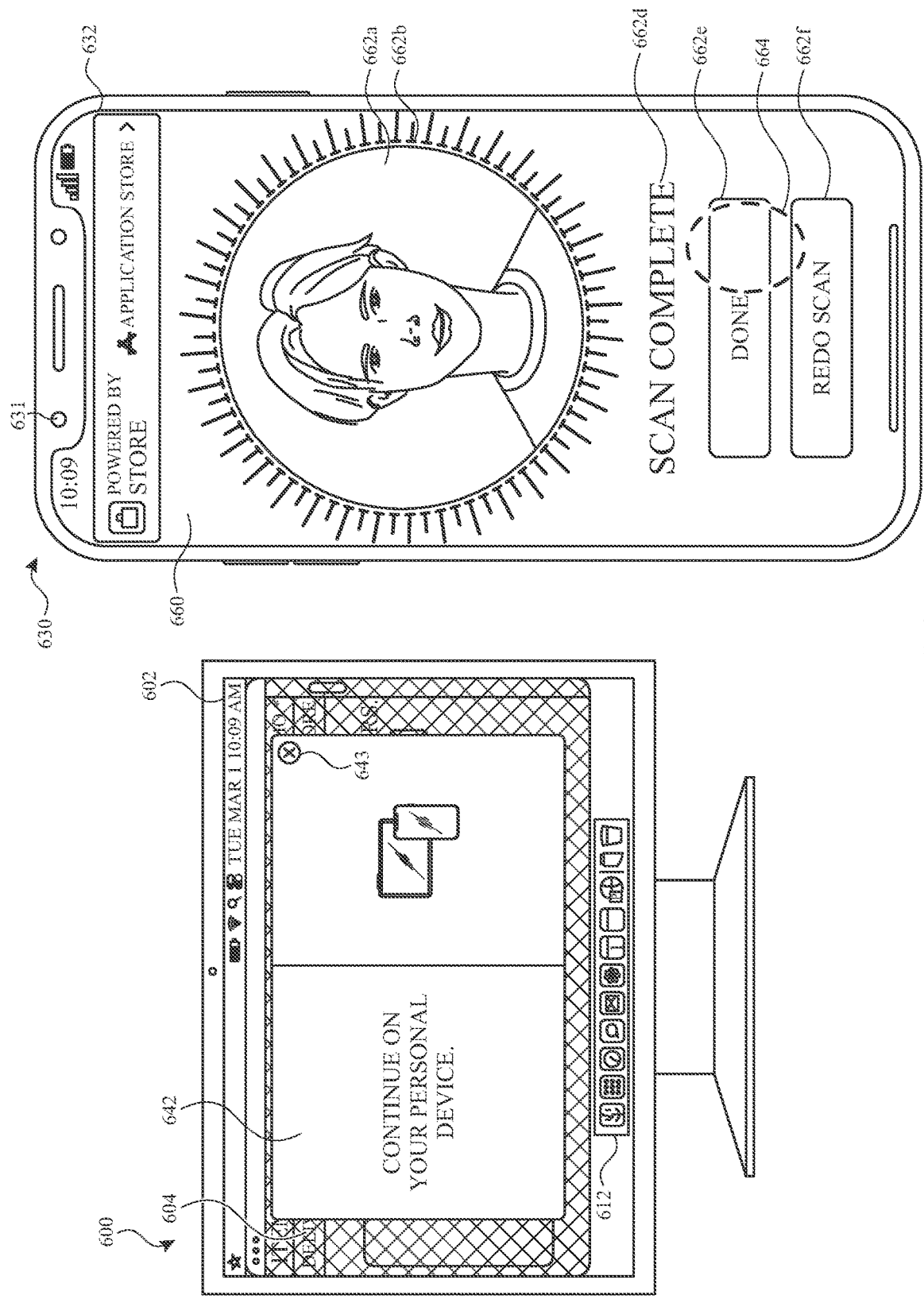

At FIG. 6I, computer system 630 detects additional and/or continued movement of the user's head, and displays progress indication 662b fully filled in to indicate that the biometric information collection process is completed. In response to a determination that the biometric information collection process is completed, computer system 630 displays indication 662d and also displays option 662e and option 662f. Option 662e is selectable to end the biometric information collection process, and option 662f is selectable to redo biometric information collection. At FIG. 6I, computer system 630 detects user input 664, which is a tap input corresponding to selection of option 662e.

Figure 6J:
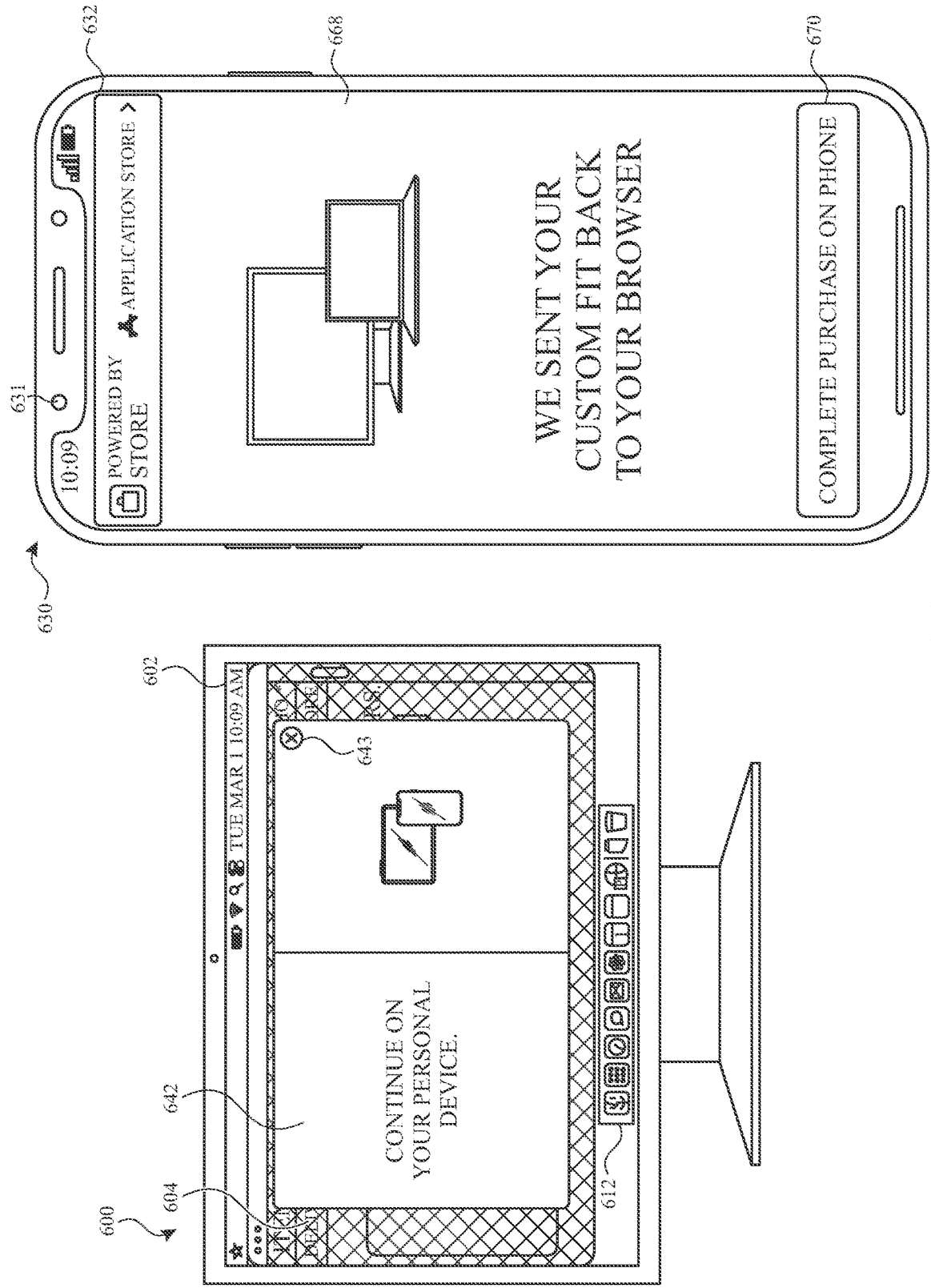

At FIG. 6J, in response to detecting user input 664, computer system 630 causes device fit information corresponding to the collected biometric information to be transmitted back to computer system 600, and displays user interface 668 which indicates that the device fit information was transmitted back to computer system 600. Accordingly, the user is able to use the biometric information that was captured using computer system 630 to complete the ordering and/or item configuration process on computer system 600. User interface 668 also includes option 670, that is selectable for the user to complete the item ordering and/or item configuration process for item 606 on computer system 630 rather than on computer system 600. In some embodiments, the device fit information that is transmitted from computer system 630 to computer system 600 identifies one or more components for item 606, and/or identifies one or more options for item 606 selected from a plurality of option choices based on the collected biometric information. In some embodiments, the device fit information that is transmitted from computer system 630 to computer system 600 does not include the actual biometric information that was collected by computer system 630. Rather, the device fit information includes one or more options for item 606 that were selected based on the biometric information, without transmitting the actual biometric information. For example, in some embodiments, item 606 (e.g., the item being ordered and/or configured) includes a first component that includes a plurality of physical configuration options, such as a plurality of size options and/or a plurality of shape options. In some embodiments, the biometric information collected by computer system 630 includes one or more facial scans and/or one or more head scans. In some embodiments, the one or more facial scans and/or one or more head scans are used to determine a first size option of the plurality of size options and/or a first shape option of the plurality of shape options, and the first size option and/or the first shape option are communicated to and/or provided to computer system 600, but the one or more facial scans and/or one or more head scans are not transmitted to computer system 600 (and/or, in some embodiments, are not transmitted to any computer system external to computer system 630).

In some embodiments, the item being ordered and/or configured (e.g., item 606 and/or item X606) is a head-mounted computer system that includes a light seal component and/or a headband component. In some embodiments, the light seal component comes in a plurality of physical dimension configurations, such as a plurality of size configurations and/or shape configurations. In some embodiments, the headband component comes in a plurality of physical dimension configurations, such as a plurality of size configurations and/or shape configurations. In some embodiments, a light seal component is a physical component that fits between the user's face and the computer system, a display device, and/or one or more display generation components to block out light (e.g., some light and/or all light) (e.g., external light and/or light that is not output by the computer system, a display device, and/or one or more display generation components) from reaching the eyes of the user. For example, in some embodiments, a light seal component creates a seal around the eyes of the user so that the user can see one or more display components without external light disrupting the user's view of the one or more display components. In some embodiments, a particular light seal component that has a particular physical dimension configuration is selected (e.g., from a plurality of physical dimension configurations) based on user biometric information so that the light seal fits the face of the user in order to adequately block out external light from reaching the eyes of the user while the head-mounted system is worn by the user. In some embodiments, a particular headband component having a particular physical dimension configuration is selected (e.g., from a plurality of physical dimension configurations) based on user biometric information so that the headband component fits snugly on the user's head to keep the head-mounted system from moving while the user is wearing the head-mounted system and is moving around.

At FIG. 6K, in response to receiving device fit information (e.g., device fit information that is determined based on biometric information collected by computer system 630), computer system 600 displays user interface 672. User interface 672 includes option 674 that is selectable to cease display of user interface 672 and return to user interface 604. At FIG. 6K, computer system 600 detects user input 676, which is a mouse click input corresponding to selection of option 674.

At FIG. 6L1, in response to user input 676, computer system 600 ceases display of user interface 672, and displays user interface 604. In FIG. 6L1, user interface 604 is updated to include indication 678, which indicates that device fit information for the user (e.g., device fit information that is determined based on biometric information collected from the user) has been received. In some embodiments, indication 678 also indicates that one or more options corresponding to item 606 have also been applied and/or selected based on the device fit information. For example, as discussed above, a first physical dimension configuration (e.g., a first size and/or a first shape) is selected for item 606 and/or a first component of item 606 from a plurality of physical dimension configurations based on the device fit information. At FIG. 6L1, computer system 600 detects user input 680, which is a click and drag user input corresponding to a user request to scroll user interface 604 downwards.

At FIG. 6L2, in response to user input 676, computer system 600 ceases display of user interface 672, and displays user interface 604. In FIG. 6L2, user interface 604 is updated to include indication 678, which indicates that device fit information for the user (e.g., device fit information that is determined based on biometric information collected from the user) has been received. In some embodiments, indication 678 also indicates that one or more options corresponding to item X606 have also been applied and/or selected based on the device fit information. For example, as discussed above, a first physical dimension configuration (e.g., a first size and/or a first shape) is selected for item X606 and/or a first component of item X606 from a plurality of physical dimension configurations based on the device fit information.

At FIG. 6L2, indication 678 includes one or more options corresponding to a light seal component for item X606 based on the biometric information collected from the user. In some embodiments, a light seal component comes in a plurality of physical dimension configurations, such as a plurality of size configurations and/or shape configurations. In some embodiments, a light seal component is a physical component that fits between the user's face and the computer system, a display device, and/or one or more display generation components to block out light (e.g., some light and/or all light) (e.g., external light and/or light that is not output by the computer system, a display device, and/or one or more display generation components) from reaching the eyes of the user. For example, in some embodiments, a light seal component creates a seal around the eyes of the user so that the user can see one or more display components without external light disrupting the user's view of the one or more display components. In some embodiments, indication 678 includes one or more options corresponding to respective light seal components that have respective physical dimension configurations selected (e.g., from a plurality of physical dimension configurations) based on user biometric information so that the light seal fits the face of the user in order to adequately block out external light from reaching the eyes of the user while the head-mounted system is worn by the user. At FIG. 6L2, computer system 600 detects user input 680, which is a click and drag user input corresponding to a user request to scroll user interface 604 downwards.

At FIG. 6M, in response to detecting user input 680, computer system 600 displays option 682 within user interface 604. Option 682 is selectable to initiate a process for selecting one or more customizable accessories for item 606. At FIG. 6M, computer system 600 detects user input 684, which is a mouse click input corresponding to selection of option 682.

At FIG. 6N1, in response to detecting user input 684, computer system 600 displays user interface 686. In the depicted embodiments, user interface 686 partially overlays user interface 604. In FIG. 6N1, computer system 600 determines that the user would benefit from and/or requires a custom accessory. For example, computer system 600 determines that the user would benefit from and/or requires a custom accessory based on user information corresponding to the user, such as previously stored user biometric information corresponding to the user and/or biometric information collected by computer system 630 in FIGS. 6F-6I above. In the depicted embodiments, the custom accessory is a customized set of earpads for item 606 that will fit the ears of the user. As discussed above, in some embodiments, the item being ordered and/or configured is a head-mounted computer system rather than a set of headphones. In some embodiments, the head-mounted computer system includes one or more optical elements (e.g., one or more optical lenses such as corrective lenses 11.3.2-216 and/or one or more transparent display generation components) that a user looks through. In some embodiments, the custom accessory is a set of prescription optical elements that correspond to a vision prescription of the user. In some embodiments, the vision prescription of the user is previously stored and accessed by computer system 600. In some embodiments, the vision prescription of the user is determined by computer system 630 (e.g., in FIGS. 6F-6I). In some such embodiments, computer system 600 determines that the user would benefit from and/or requires prescription optical lenses based on vision prescription information corresponding to the user. User interface 686 includes option 688*a*, that is selectable to initiate a process for custom engraving of the custom accessories, and option 688*b* that is selectable to use the user's stored personal information (e.g., stored biometric information (e.g., stored vision prescription information)) in order to order a custom accessory for the user. User interface 686 also includes option 686*c* that is selectable to cease display of user interface 686. At FIG. 6N1, computer system 600 detects user input 690, which is a mouse click input corresponding to selection of option 688*b*.

In some embodiments, the techniques and user interface(s) described in FIGS. 6A-6B1, 6C-6L1, and 6M-6P are used to order and/or configure a computer system, such as a computer system illustrated in FIGS. 5C-5F. For example, FIG. 6N2 illustrates an embodiment in which computer system 600 displays user interface X686.

At FIG. 6N2, in response to detecting user input 684, computer system 600 displays user interface X686. In the depicted embodiments, user interface X686 partially overlays user interface 604. In FIG. 6N2, computer system 600 determines that the user would benefit from and/or requires a custom accessory. For example, computer system 600 determines that the user would benefit from and/or requires a custom accessory based on user information corresponding to the user, such as previously stored user biometric information corresponding to the user and/or biometric information collected by computer system 630 in FIGS. 6F-6I above. In the depicted embodiments, the custom accessory for item X606 includes one or more optical elements (e.g., one or more optical lenses such as corrective lenses 11.3.2-216 and/or one or more transparent display generation components) that a user looks through. In some embodiments, the custom accessory is a set of prescription optical elements that correspond to a vision prescription of the user. In some embodiments, the vision prescription of the user is previously stored and accessed by computer system 600. In some embodiments, the vision prescription of the user is determined by computer system 630 (e.g., in FIGS. 6F-6I). In some such embodiments, computer system 600 determines that the user would benefit from and/or requires prescription optical lenses based on vision prescription information corresponding to the user. User interface X686 includes option X688*a*, that is selectable to initiate a process for custom engraving of the custom accessories, and option X688*b* that is selectable to use the user's stored personal information (e.g., stored biometric information (e.g., stored vision prescription information)) in order to order a custom accessory for the user. User interface X686 also includes option X686*d* that is selectable to add the user's personal information, such as biometric information and/or prescription information. User interface X686 also includes option X686*c* that is selectable to cease display of user interface X686. At FIG. 6N1, computer system 600 detects user input X690, which is a mouse click input corresponding to selection of option X688*b*.

At FIG. 6O, in response to detecting user input 690, computer system 600 ceases display of user input 686, and displays user interface 604. User interface 604 has been updated to display indication 691 to indicate that one or more custom accessories have been added to the user's order. Indication 691 includes indication 692*a* which indicates that the user has chosen not to engrave the user's custom accessories, option 692*b* that is selectable to edit the user's custom accessories (e.g., selectable to re-display user interface 686), indication 692*c* which indicates that the user has completed selections for custom accessories for item 606, and price indication 692*d*, which indicates the additional cost for ordering the selected custom accessories. At FIG. 6O, computer system 600 detects user input 694, which is a click and drag mouse input corresponding to a user request to scroll user interface 604 downwards.

At FIG. 6P, in response to detecting user input 694, computer system 600 displays user interface 604 scrolling downwards. In FIG. 6P, user interface 604 displays price 696*a*, which includes the final price for item 606 with the various selections made by the user. User interface 604 also includes indication 696*b*, which identifies various options for item 606*t* that were selected by the user. User interface 604 also includes option 696*c*, that is selectable to add the configured item 606 to the user's shopping cart. User interface 604 also includes option 696*d*, that is selectable by a user to save the selected options and/or save the configured options and/or settings for item 606 to the user's account so that the user can load them again at a later time (e.g., via option 616 in FIG. 6A).

FIG. 7 is a flow diagram illustrating a method for receiving user information and/or device fit information using a computer system in accordance with some embodiments. Method 700 is performed at a computer system (e.g., 100, 300, 500, and/or 600) (e.g., a smart phone, a smart watch, a tablet, a laptop, a desktop, a wearable device, and/or head-mounted device) that is in communication with one or more display generation components (e.g., 340, and/or 602) (e.g., a visual output device, a 3D display, a display having at least a portion that is transparent or translucent on which images can be projected (e.g., a see-through display), a projector, a heads-up display, and/or a display controller) and one or more input devices (e.g., 350, 355, and/or 359) (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial). Some operations in method 700 are, optionally, combined, the orders of some operations are, optionally, changed, and some operations are, optionally, omitted.

As described below, method 700 provides an intuitive way for receiving user information and/or device fit information. The method reduces the cognitive burden on a user for receiving user information and/or device fit information, thereby creating a more efficient human-machine interface. For battery-operated computing devices, enabling a user to receive user information and/or device fit information faster and more efficiently conserves power and increases the time between battery charges.

In some embodiments, the computer system (e.g., 600) receives (702), via the one or more input devices (e.g., a mouse used to move the mouse cursor in FIGS. 6A-6P), a first set of user inputs (e.g., 620, 624, and/or one or more user inputs selecting one of options 618*a*-618*c* in FIG. 6A) (e.g., one or more user inputs; one or more keyboard inputs; one or more mouse inputs; one or more trackpad inputs; one or more inputs on a touch-sensitive surface (e.g., one or more tap inputs and/or one or more swipe inputs on the touch-sensitive surface); one or more gestures; one or more voice inputs; one or more gaze inputs; one or more mechanical inputs via one or more mechanical input mechanisms (e.g., one or more physical buttons, one or more physical dials, and/or one or more physical crowns); and/or one or more air gestures) corresponding to configuring options for a first item (e.g., 606 and/or X606) (e.g., a first item to be purchased, a first item selected by a user, a first item to be used by a user, a first item being set up for use by a user, and/or a first item being ordered by a user). In some embodiments, the first set of user inputs (e.g., 620, 624, and/or one or more user inputs selecting one of options 618*a*-618*c* in FIG. 6A) are received as part of a progression and/or set of steps corresponding to the first item (e.g., 606 and/or X606) (e.g., one or more steps corresponding to the first item and/or an ordered progression of steps corresponding to the first item) (e.g., a set of steps to order the first item, a set of steps to purchase the first item, a set of steps to use the first item, and/or a set of steps to set up the first item).

In response to receiving the first set of inputs (e.g., 620, 624, and/or one or more user inputs selecting one of options 618*a*-618*c* in FIG. 6A) (704), the computer system displays (706), via the one or more display generation components (e.g., 602), a first prompt (e.g., 626, 628*a*, and/or 628*b*) instructing a user of the computer system (e.g., 600) to use a first external device (e.g., 630) separate from the computer system (e.g., a second computer system different from the computer system; and/or a first external device that has one or more biometric information capture sensors (e.g., 631) (e.g., one or more cameras, one or more depth cameras, one or more fingerprint capture sensors, one or more face capture sensors, one or more iris capture sensors; and/or one or more biometric information capture sensors that are not included in and/or available to the computer system) (e.g., a first prompt instructing the user to use the first external device in order to continue with and/or advance the progression of steps corresponding to the first item; a first prompt instructing the user to use the first external device to continue with an order process for ordering the first item, a purchase process for purchasing the first item, and/or a setup process for using the first item; and/or a first prompt instructing the user to collect biometric information using the first external device).

Subsequent to displaying the first prompt (e.g., 626, 628*a*, and/or 628*b*) (708) (e.g., after display of the first prompt is initiated and/or while the first prompt is displayed), the computer system receives (710) (e.g., from the first external device (e.g., 630) and/or from a second external device (e.g., a server) different from the first external device and the computer system) information (e.g., biometric information, user identification information, and/or product information (e.g., a particular product and/or a particular size of the first item that is selected based on biometric information captured by the first external device)) based on biometric information (e.g., one or more head scans, head size, head shape, one or more eye scans, eye shape, vision prescription, interpupillary distance, one or more hand scans, hand size, hand shape, one or more body scans, body size, and/or body shape) captured by the first external device (e.g., captured by one or more sensors that are part of the first external device, captured by one or more sensors that are built into the first external device, and/or captured by one or more sensors in communication with the first external device) (e.g., FIGS. 6E-6I, device 630 captures biometric information; in FIG. 6J, corresponding information is transmitted to computer system 600; and in FIG. 6K, the corresponding information is received by computer system 600).

Subsequent to receiving the information based on biometric information captured by the first external device (712), the computer system displays (714), via the one or more display generation components (e.g., 602), a first set of options (e.g., one or more options) (e.g., FIGS. 6K-6L) corresponding to the first item (e.g., 606 and/or X606), wherein the first set of options includes at least a first option (e.g., a device size option and/or an item size option) that has been selected based on the biometric information captured by the first external device (e.g., in some embodiments, in FIGS. 6K-6L, computer system 600 displays one or more options (e.g., one or more size options; one or more physical configuration options; and/or one or more physical dimensions options corresponding to item 606 and/or item X606 have been selected based on biometric information captured by electronic device 630 (e.g., within 672 and/or 678)). Directing a user to use an external device to capture biometric information enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first option (e.g., "FIT" in FIGS. 6B and 6L) corresponds to (e.g., the first option is and/or the first option is indicative of) a configuration option for configuring a physical parameter (e.g., size, length, width, height, and/or shape) (e.g., a physical parameter of the first item and/or a physical parameter of one or more components (e.g., light seal (e.g., a component that is configured to block light, and/or a component that is configured to block external light (e.g., some and/or all external light) from reaching the eyes of a person; a component of a head-mounted system that is positioned between the head mounted system and the face of the user (e.g., above, below, and/or, optionally, to the sides of one or more display generation components of the head-mounted system)) and/or headband) of the first item) of the first item (e.g., 606 and/or X606) to fit one or more biometric features (e.g., head size, head shape, eye size, eye shape, distance between eyes, nose size, and/or nose shape) corresponding to the biometric information captured by the first external device. Directing a user to use an external device to capture biometric information, and then using the biometric information captured by the external device to determine one or more options for an item enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying the first prompt comprises displaying a machine-readable code (e.g., 628b) (e.g., a QR code, bar code, non-textual code, or other machine-readable code). In some embodiments, the machine-readable code causes the first external device (e.g., 630) to display an option (e.g., 638) that is selectable to initiate a process for capturing biometric information using the first external device. In some embodiments, the machine-readable code (e.g., 628b) causes the first external device (e.g., 630) to display an option (e.g., 638) that is selectable to cause the first external device to display a user interface for an application and/or a portion of an application for capturing biometric information. Directing a user to use an external device to capture biometric information by displaying a machine-readable code enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first external device (e.g., 630) comprises one or more sensors (e.g., 631) (e.g., one or more biometric sensors; one or more facial scanning sensors; one or more eye scanning sensors; and/or one or more head scanning sensors); and the computer system (e.g., 600) does not include (e.g., is not in direct communication with; is not connected to; and/or does not house) the one or more sensors. Directing a user to use an external device that includes one or more sensors that are not available to the computer system in order to capture biometric information enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first external device (e.g., 630) is smaller (e.g., in terms of volume of and/or surface area) and/or lighter (e.g., weighs less than and/or has less mass than) than the computer system (e.g., 600). Directing a user to use an external device that is more convenient to capture biometric information than the computer system (e.g., by virtue of the external device being smaller than the computer system) enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the information does not include the biometric information captured by the first external device (e.g., 630) (e.g., in FIG. 6K, computer system 600 receives component size information and/or a particular physical component code and/or other information pertaining to item 606 and/or item X606 that is determined based on head scan information collected by device 630, without receiving the actual head scan information collected by device 630). In some embodiments, the computer system receives information that is determined based on the biometric information captured by the first external device, but does not receive the biometric information itself. In some embodiments, the information includes product information (e.g., information identifying a specific product, information identifying a specific product information that has particular physical characteristics (e.g., size and/or shape) determined based on the biometric information). Receiving information from the first external device that excludes biometric information captured by the first external device improves device security and/or privacy protection by limiting sensitive biometric information that is transmitted between devices.

In some embodiments, the information is indicative of (e.g., identifies) a first component (e.g., a first part and/or a first product) corresponding to the first item (e.g., 606 and/or X606) (e.g., a first part and/or a first product that is incorporated and/or added to the first item; a first part and/or a first product that is used with the first item; and/or a first part and/or a first product that is compatible with the first item). Using biometric information captured by an external device in order to identify one or more components makes the user-system interface more efficient (e.g., by helping the user to provide proper inputs and reducing errors) which, additionally, reduces power usage and improves battery life of the device by enabling the user to use the system more quickly and efficiently.

In some embodiments, the first item (e.g., 606 and/or X606) is an extended reality (e.g., augmented reality and/or virtual reality) headset. Directing a user to use an external device to capture biometric information to be used for an extended reality headset enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first option (e.g., "FIT" in FIGS. 6B and 6L) corresponds to (e.g., identifies and/or is indicative of) a light seal component (e.g., 1-110, 1-210, a first light seal of a plurality of light seal options, a first light seal that has one or more physical characteristics (e.g., size and/or shape) that are determined based on the biometric information captured by the first external device) for the extended reality headset (e.g., in some embodiments, item 606 and/or item X606 is an extended reality headset). Using biometric information captured by an external device in order to identify one or more components of an extended reality headset makes the user-system interface more efficient (e.g., by helping the user to provide proper inputs and reducing errors) which, additionally, reduces power usage and improves battery life of the device by enabling the user to use the system more quickly and efficiently.

In some embodiments, the light seal component has a first physical characteristic (e.g., depth, size and/or shape), and the first physical characteristic is selected from a plurality of light seal physical characteristic options (e.g., a plurality of depths, sizes, and/or shapes) based on vision prescription information for a person (e.g., a person ordering the first item and/or a person for whom the first item is being ordered) (e.g., in some embodiments, in FIGS. 6L1 and/or 6L2, user interface object 678 displays a selection of a particular light seal component and/or a particular light seal component physical dimension configuration that is selected based on vision prescription information for the user and/or based on biometric information captured by device 630). In some embodiments, the light seal component is available in a plurality of depths, sizes and/or shapes, and a first depth, size, and/or shape of the plurality of depths, sizes, and/or shapes is selected based, at least in part, on vision prescription information for a person. In some embodiments, the light seal component is configured to be positioned between the face of a user and one or more display generation components of a head-mounted system. In some embodiments, the light seal component is available in a plurality of physical dimension configurations (e.g., a plurality of depths, sizes, and/or shapes). In some embodiments, a first physical dimension configuration causes the one or more display generation components to be positioned a first distance away from the face and/or eyes of the user when the head-mounted system is worn on the head of the user, and a second physical dimension configuration causes the one or more display generation components to be positioned a second distance away from the face and/or eyes of the user when the head-mounted system is worn on the head of the user, wherein the second distance is different from the first distance. Automatically determining a light seal component physical characteristic based on user vision prescription information enables this operation to be performed automatically without further user input.

In some embodiments, the first option (e.g., "FIT" in FIGS. 6B, 6L1, and/or 6L2) corresponds to (e.g., identifies and/or is indicative of) a headband component (e.g., a first headband of a plurality of headband options, a first headband that has one or more physical characteristics (e.g., size and/or shape) that are determined based on the biometric information captured by the first external device) for the extended reality headset (e.g., in some embodiments, item 606 and/or item X606 is an extended reality headset). Using biometric information captured by an external device in order to identify one or more components of an extended reality headset makes the user-system interface more efficient (e.g., by helping the user to provide proper inputs and reducing errors) which, additionally, reduces power usage and improves battery life of the device by enabling the user to use the system more quickly and efficiently.

In some embodiments, the first set of user inputs (e.g., 620, 624, and/or one or more user inputs selecting one or more of options 618a-618c) correspond to user selection of one or more options (e.g., model, color, amount of memory, and/or accessories) corresponding to the first item (e.g., 606 and/or X606). Allowing a user to select one or more options corresponding to the first item makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system (e.g., 600) receives, via the one or more input devices, a second set of user inputs (e.g., 600 and/or 624) (e.g., one or more user inputs; one or more keyboard inputs; one or more mouse inputs; one or more trackpad inputs; one or more inputs on a touch-sensitive surface (e.g., one or more tap inputs and/or one or more swipe inputs on the touch-sensitive surface); one or more gestures; one or more voice inputs; one or more gaze inputs; one or more mechanical inputs via one or more mechanical input mechanisms (e.g., one or more physical buttons, one or more physical dials, and/or one or more physical crowns); and/or one or more air gestures) corresponding to configuring options for a second item (e.g., 606 and/or X606) (e.g., the first item and/or a second item different from the first item) (e.g., a second item to be purchased, a second item selected by a user, a second item to be used by a user, a second item being set up for use by a user, and/or a second item being ordered by a user) as part of a set of steps corresponding to the second item. In some embodiments, the second set of user inputs are received as part of a progression and/or set of steps corresponding to the second item (e.g., one or more steps corresponding to the second item and/or an ordered progression of steps corresponding to the second item) (e.g., a set of steps to order the second item, a set of steps to purchase the second item, a progression of steps to use the second item, and/or a set of steps to set up the second item). In response to receiving the second set of inputs, the computer system displays, via the one or more display generation components (e.g., 602), a second prompt (e.g., 626, 628a, and/or 628b) instructing a user of the computer system to use a second external device (e.g., 630) (e.g., the first external device and/or a second external device separate from the first external device) separate from the computer system (e.g., 600) (e.g., a second computer system different from the computer system; and/or a second external device that has one or more biometric information capture sensors (e.g., one or more cameras, one or more depth cameras, one or more fingerprint capture sensors, one or more face capture sensors, one or more iris capture sensors; and/or one or more biometric information capture sensors that are not included in and/or available to the computer system)) (e.g., a second prompt instructing the user to use the second external device in order to continue with and/or advance the progression of steps corresponding to the second item; a second prompt instructing the user to use the second external device to continue with an order process for ordering the second item, a purchase process for purchasing the second item, and/or a setup process for using the second item; and/or a second prompt instructing the user to collect biometric information using the second external device). Subsequent to displaying the second prompt (e.g., 626, 628*a*, and/or 628*b*) (e.g., after display of the second prompt is initiated and/or while the second prompt is displayed), the computer system (e.g., 600) receives (e.g., from the second external device and/or from a third external device different from the second external device and the computer system) information indicating that a person has elected to complete the set of steps corresponding to the second item (e.g., has elected to complete purchase of the second item, has elected to complete set up of the second item, and/or elected to complete an order of the second item) using the second external device (e.g., in FIG. 6J, a user can select option 670 to elect to complete the purchase of item 606 and/or item X606 using phone 630). In response to receiving the information indicating that the person has elected to complete the set of steps corresponding to the second item using the second external device, the computer system (e.g., 600) displays, via the one or more display generation components (e.g., 602), an indication that a person has elected to complete the set of steps corresponding to the second item using the second external device (e.g., displaying an indication that a user has elected to complete and/or has completed a purchase of the second item using the second external device) (e.g., when a user selects option 670 on device 630, computer system 600 displays an indication that the user has selected option 670). Allowing a user to complete the set of steps corresponding to the second item on either the computer system of the second external device makes the user-system interface more efficient (e.g., by helping the user to provide proper inputs and reducing errors) which, additionally, reduces power usage and improves battery life of the device by enabling the user to use the system more quickly and efficiently.

In some embodiments, the first option (e.g., "FIT" in FIGS. 6B, 6L1, and/or 6L2) is selected based on the biometric information captured by the first external device (e.g., 630) and based on a second set of information (e.g., non-biometric information and/or biometric information not captured by the first external device) different from the biometric information captured by the first external device. Using biometric information captured by the first external device as well as additional information to automatically select the first option makes the user-system interface more efficient (e.g., by helping the user to provide proper inputs and reducing errors) which, additionally, reduces power usage and improves battery life of the device by enabling the user to use the system more quickly and efficiently. Furthermore, doing so enables these operations to be performed automatically without further user input.

In some embodiments, the second set of information includes user prescription information (e.g., vision prescription information corresponding to a person and/or other prescription information corresponding to a person) (e.g., prescription information entered by a user, prescription information received from a doctor, and/or prescription information that was not captured by the first external device). Using biometric information captured by the first external device as well as additional user prescription information to automatically select the first option makes the user-system interface more efficient (e.g., by helping the user to provide proper inputs and reducing errors) which, additionally, reduces power usage and improves battery life of the device by enabling the user to use the system more quickly and efficiently. Furthermore, doing so enables these operations to be performed automatically without further user input.

In some embodiments, the computer system (e.g., 600) receives, via the one or more input devices, a third set of user inputs (e.g., 620 and/or 624) (e.g., one or more user inputs; one or more keyboard inputs; one or more mouse inputs; one or more trackpad inputs; one or more inputs on a touch-sensitive surface (e.g., one or more tap inputs and/or one or more swipe inputs on the touch-sensitive surface); one or more gestures; one or more voice inputs; one or more gaze inputs; one or more mechanical inputs via one or more mechanical input mechanisms (e.g., one or more physical buttons, one or more physical dials, and/or one or more physical crowns); and/or one or more air gestures) corresponding to configuring options for the first item (e.g., 606 and/or X606). In response to receiving the third set of inputs: in accordance with a determination that a first type of information (e.g., product fit information and/or user biometric information) corresponding to a user is not available (e.g., the user has not previously provided and/or entered the first type of information, the user has not previously been measured for the first type of information, and/or the first type of information corresponding to the user is not stored (e.g., is not stored in a remote server and/or is not stored in a location accessible by the computer system)), the computer system (e.g., 600) displays, via the one or more display generation components (e.g., 602), the first prompt (e.g., 626, 628*a*, and/or 628*b*) instructing the user of the computer system (e.g., 600) to use the first external device (e.g. 630) separate from the computer system; and in accordance with a determination that the first type of information corresponding to the user is available (e.g., the user has previously provided and/or entered the first type of information, the user has previously been measured for the first type of information, and/or the first type of information corresponding to the user is stored (e.g., is stored in a remote server and/or is stored in a location accessible by the computer system)), the computer system (e.g., 600) displays, via the one or more display generation components (e.g., 602), a second set of options (e.g., one or more options) (e.g., the first set of options and/or a second set of options different from the first set of options) corresponding to the first item without displaying the first prompt, wherein the second set of options includes at least a second option (e.g., the first option and/or a second option different from the first option) (e.g., a device size option and/or an item size option) that has been selected based on the first type of information corresponding to the user (e.g., the computer system displays object 678 in FIGS. 6L1 and/or 6L2 (optionally with one or more selected options displayed within object 678) without displaying prompt 626, 628*a*, and/or 628*b*). Automatically using stored information to select one or more options corresponding to the first item enables these operations to be performed automatically without further user input.

In some embodiments, the first type of information corresponding to the user includes user prescription information (e.g., vision prescription information and/or other prescription information); displaying the second set of options (e.g., 678) corresponding to the first item (e.g., 606 and/or X606) includes displaying a first light seal option of a plurality of light seal options (e.g., light seal options with different sizes and/or shapes) that has been selected based on the user prescription information; and displaying the second set of options corresponding to the first item further comprises: in accordance with a determination that current prescription information corresponding to the user contradicts (e.g., is different from) the user prescription information (e.g., updated prescription information and/or different prescription information for the user is available and/or is detected), displaying, via the one or more display generation components (e.g., 602) (e.g., concurrently with the first light seal option), a suggestion for a second light seal option different from the first light seal option, wherein the second light seal option is selected from the plurality of light seal options based on the current prescription information corresponding to the user. In some embodiments, in accordance with a determination that current prescription information does not contradict the user prescription information (e.g., current prescription information different from the user prescription information is not available and/or is not detected), the computer system forgoes displaying the suggestion for the second light seal option. Automatically suggesting a different light seal option based on updated user prescription information enables these operations to be performed automatically without further user input.

In some embodiments, the computer system (e.g., 600) displays, via the display generation component (e.g., 602), one or more options (e.g., 610, 614, 616, and/or 618*a*-618*c*) corresponding to the first item (e.g., 606 and/or X606), including an in-store option (e.g., 614) that is selectable to initiate a process for scheduling an appointment to view the first item in a physical store location. While displaying the one or more options (e.g., 610, 614, 616, and/or 618*a*-618*c*) corresponding to the first item (e.g., 606 and/or X606), the computer system receives, via the one or more input devices, a set of user inputs (e.g., one or more user inputs; one or more keyboard inputs; one or more mouse inputs; one or more trackpad inputs; one or more inputs on a touch-sensitive surface (e.g., one or more tap inputs and/or one or more swipe inputs on the touch-sensitive surface); one or more gestures; one or more voice inputs; one or more gaze inputs; one or more mechanical inputs via one or more mechanical input mechanisms (e.g., one or more physical buttons, one or more physical dials, and/or one or more physical crowns); and/or one or more air gestures) corresponding to selection of the in-store option (e.g., 614). In response to receiving the set of user inputs corresponding to selection of the in-store option (e.g., 614), the computer system (e.g., 600) initiates a process for scheduling an appointment for a user of the computer system to view the first item (e.g., 606 and/or X606) in a physical store location. In some embodiments, the computer system displays, via the one or more display generation components (e.g., 602), a user interface that includes one or more options (e.g., one or more date and/or time options; and/or one or more physical store location options) that are selectable by the user to schedule an appointment for the user to view the first item in a physical store location. Allowing a user to book an in-store appointment to view the first item makes the user-system interface more efficient (e.g., by helping the user to provide proper inputs and reducing errors) which, additionally, reduces power usage and improves battery life of the device by enabling the user to use the system more quickly and efficiently.

In some embodiments, the first external device (e.g., 630) uses (e.g., stores, accesses, downloads, and/or installs) a first portion of a first application (e.g., "item sizing app" in FIG. 6D) (e.g., a portion of an application that is usable without downloading and/or installing the full application, a portion of an application that is accessible by selecting an option within a camera user interface (e.g., an option that is displayed within the camera user interface in response to detecting one or more computer-readable codes being displayed within the camera user interface)) to capture the biometric information without downloading (or, in some embodiments, without installing) a second portion of the first application (e.g., without downloading and/or installing the entirety of the first application) (e.g., in some embodiments, FIGS. 6D-6J, device 630 uses a portion of the item sizing app without downloading and/or installing the entire item sizing app). Using a portion of an application to capture biometric information without downloading other portions of the application makes the user-system interface more efficient (e.g., by helping the user to provide proper inputs and reducing errors) which, additionally, reduces power usage and improves battery life of the device by enabling the user to use the system more quickly and efficiently.

In some embodiments, subsequent to displaying the first prompt (e.g., 626, 628*a*, and/or 628*b*) and prior to receiving the information based on biometric information captured by the first external device (e.g., 630) (e.g., FIG. 6K), the computer system (e.g., 600) displays, via the one or more display generation components (e.g., 602), a first user interface (e.g., 642) indicative of the computer system (e.g., 600) waiting to receive information based on biometric information captured by the first external device (e.g., 630) (e.g., a first user interface instructing the user to interact with the first external device). Displaying the first user interface indicative of the computer system waiting to receive information based on biometric information captured by the first external device makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., the device is waiting to receive information corresponding to biometric information captured by the first external device).

In some embodiments, in response to receiving the information based on biometric information captured by the first external device (e.g., 630) (e.g., FIG. 6K), the computer system (e.g., 600) displays, via the one or more display generation components (e.g., 602), a recapture option that is selectable to initiate a process for recapturing biometric information using the first external device (in some embodiments, the recapture option is displayed concurrently with an indication that the computer system has received information based on biometric information captured by the first external device) (e.g., in some embodiments, (for example, in FIG. 6K), computer system 600 displays a recapture option similar to option 662*f* displayed by device 630; and/or in some embodiments, object 678 is a recapture option that is selectable to initiate a process for recapturing biometric information using external device 630). While displaying the recapture option, the computer system (e.g., 600) receives, via the one or more input devices, a set of user inputs (e.g., one or more user inputs; one or more keyboard inputs; one or more mouse inputs; one or more trackpad inputs; one or more inputs on a touch-sensitive surface (e.g., one or more tap inputs and/or one or more swipe inputs on the touch-sensitive surface); one or more gestures; one or more voice inputs; one or more gaze inputs; one or more mechanical inputs via one or more mechanical input mechanisms (e.g., one or more physical buttons, one or more physical dials, and/or one or more physical crowns); and/or one or more air gestures) corresponding to selection of the recapture option. In response to receiving the set of user inputs corresponding to selection of the recapture option, the computer system displays (e.g., re-displays), via the one or more display generation components (e.g., 602), the first prompt (e.g., 626, 628*a*, and/or 628*b*). Providing the user with an option to recapture biometric information using the first external device reduces the number of inputs needed to perform this operation.

Note that details of the processes described above with respect to method 700 (e.g., FIG. 7) are also applicable in an analogous manner to the methods described below. For example, method 800 optionally includes one or more of the characteristics of the various methods described above with reference to method 700. For example, in some embodiments, the computer system recited in method 800 is the first external device recited in method 700. For brevity, these details are not repeated below.

FIG. 8 is a flow diagram illustrating a method for receiving user information and/or device fit information using a computer system in accordance with some embodiments. Method 800 is performed at a computer system (e.g., 100, 300, 500, and/or 630) (e.g., a smart phone, a smart watch, a tablet, a laptop, a desktop, a wearable device, and/or head-mounted device) that is in communication with one or more display generation components (e.g., 632) (e.g., a visual output device, a 3D display, a display having at least a portion that is transparent or translucent on which images can be projected (e.g., a see-through display), a projector, a heads-up display, and/or a display controller) and one or more input devices (e.g., 350, 355, 359, 631, and/or 632) (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). Some operations in method 800 are, optionally, combined, the orders of some operations are, optionally, changed, and some operations are, optionally, omitted.

As described below, method 800 provides an intuitive way for receiving user information and/or device fit information. The method reduces the cognitive burden on a user for receiving user information and/or device fit information, thereby creating a more efficient human-machine interface. For battery-operated computing devices, enabling a user to receive user information and/or device fit information faster and more efficiently conserves power and increases the time between battery charges.

In some embodiments, the computer system (e.g., 630) receives (802), via the one or more input devices (e.g., 631), device fit information corresponding to information about a head of a person (e.g., the person shown in FIGS. 6F-6I) (e.g., biometric information corresponding to the person (e.g., head scan information, head size information, head shape information, face scan information, face size information, face shape information, eye scan information, interpupillary distance information, and/or eye shape information) (e.g., biometric information captured by one or more sensors that are in communication with the computer system) (e.g., biometric information captured in FIGS. 6H-6J) and/or non-biometric information corresponding to the person (e.g., user selection of a device size and/or user selection of a device fit)) and a first item (e.g., 606 and/or X606) (e.g., a first item being ordered by a user and/or the person; a first item being purchased by the person and/or a user; a first item to be used by the person and/or a user; and/or a first item being set up by and/or for the person and/or a user), wherein: the first item (e.g., 606 and/or X606) is configurable (e.g., available and/or selectable) in a plurality of physical dimension (e.g., size and/or shape) configurations (e.g., a plurality of different sizes and/or shapes; and or one or more components of the first item are configurable (e.g., available and/or selectable) in a plurality of different sizes and/or shapes) (804), and the device fit information is indicative of (e.g., identifies and/or corresponds to) a first physical dimension configuration of the plurality of physical dimension configurations (e.g., indicative of a first physical dimension configuration of the plurality of physical dimension configurations that will fit the person (e.g., as determined based on size information and/or biometric information corresponding to the person)) (806). The computer system (e.g., 630) provides (808) the device fit information corresponding to the head of the person and the first item (e.g., 606 and/or X606) to a first external device (e.g., 600) separate from the computer system (e.g., 630) (e.g., a second computer system different from the computer system; and/or a first external device (e.g., 600) that lacks one or more biometric information capture sensors (e.g., one or more cameras, one or more depth cameras, one or more fingerprint capture sensors, one or more face capture sensors, and/or one or more iris capture sensors) (e.g. one or more biometric information capture sensors that are included in, available to, and/or in communication with the computer system)) (e.g., making the device fit information available to the first external device, and/or transmitting the device fit information to a first location that is accessible by the first external device). In some embodiments, the device fit information is provided to the first external device (e.g., 600) to be used by the first external device as part of an ordering process for the person and/or a user to order the first item (e.g., 606 and/or X606), as part of a purchase process for the person and/or a user to purchase the first item, and/or as part of a setup process for the person and/or a user to set up and/or use the first item. Capturing device fit information using a first device, and making the device fit information available to other devices enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also enables these operations to be performed without displaying additional controls and with fewer user inputs.

In some embodiments, the device fit information is determined (e.g., by the computer system and/or by one or more external devices different from the computer system) based on biometric information corresponding to the person (e.g., biometric information corresponding to the head of the person (e.g., one or more images (e.g., of the person's head), one or more head scans, one or more face scans, and/or one or more eye scans)) (e.g., biometric information captured in FIGS. 6E-6J, and/or other biometric information). Automatically determining device fit information based on biometric information corresponding to a person reduces the number of inputs needed to perform this operation, enables this operation to be performed without displaying additional controls, and enables this operation to be performed automatically without further user input.

In some embodiments, the device fit information does not include the biometric information (e.g., the biometric information captured in FIGS. 6E-6J) corresponding to the person (e.g., does not include one or more images (e.g., of the person's head), one or more head scans, one or more face scans, and/or one or more eye scans). In some embodiments, providing the device fit information corresponding to the head of the person and the first item to a first external device (e.g., 600) separate from the computer system (e.g., 630) comprises providing the device fit information corresponding to the head of the person and the first item to the first external device without providing the biometric information corresponding to the person to the first external device. Excluding biometric information corresponding to a person when providing device fit information provides improved security/privacy by limiting the transmission of sensitive biometric information.

In some embodiments, the first external device (e.g., 600) corresponds to (e.g., is located in and/or is used in) a device located at a physical store (e.g., a physical store that is selling and/or demonstrating the first item). In some embodiments, the device fit information is used in a physical store in order for a person (e.g., the person or a different person) to purchase and/or order the first item (e.g., 606 and/or X606) (e.g., purchase and/or order the first item in the first physical dimension configuration). Allowing a user to use device fit information captured by their device in a physical store (e.g., to order the first item) enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first external device corresponds to (e.g., the first external device is used in the operation of) a server that is used to operate an online store (e.g., an online store selling and/or demonstrating the first item) (e.g., an online store that is being accessed by computer system 600 via user interface 604). In some embodiments, the device fit information is used in an online store in order for a person (e.g., the person or a different person) to purchase and/or order the first item (e.g., 606 and/or X606) (e.g., purchase and/or order the first item in the first physical dimension configuration) (e.g., as shown in FIGS. 6A-6P). Allowing a user to use device fit information captured by their device in an online store (e.g., to order the first item) enhances the operability of the system and makes the user-system interface more efficient (e.g. by helping the user to provide proper inputs and reducing errors) which, additionally, reduces power usage and improves battery life of the device by enabling the user to use the system more quickly and efficiently.

In some embodiments, the computer system (e.g., 600 and/or 630) displays, via the one or more display generation components (e.g., 602 and/or 632), a first option (e.g., 616) (e.g., in some embodiments, device 630 displays option 616; and/or in some embodiments, device 630 displays user interface 604, which includes option 616) to continue a transaction corresponding to the first item (e.g., 606 and/or X606) (e.g., a purchase transaction to purchase the first item and/or an order transaction to order the first item) using information collected during a visit to a physical store (e.g., device fit information and/or user biometric information (e.g., head size information and/or head shape information) that was collected in the physical store). While displaying the first option (e.g., 616), the computer system (e.g., 600 and/or 630) receives, via the one or more input devices (e.g., a mouse connected to computer system 600 and/or touch sensitive display 632), a first set of user inputs (e.g., one or more user inputs; one or more keyboard inputs; one or more mouse inputs; one or more trackpad inputs; one or more inputs on a touch-sensitive surface (e.g., one or more tap inputs and/or one or more swipe inputs on the touch-sensitive surface); one or more gestures; one or more voice inputs; one or more gaze inputs; one or more mechanical inputs via one or more mechanical input mechanisms (e.g., one or more physical buttons, one or more physical dials, and/or one or more physical crowns); and/or one or more air gestures) corresponding to selection of the first option (e.g., 616). In response to receiving the first set of user inputs, the computer system (e.g., 600 and/or 630) initiates a process for continuing the transaction corresponding to the first item (e.g., 606 and/or X606) using information collected during a visit to a physical store (e.g., selecting option 616 allows a user to "pick up where they left off" by continuing a transaction that they initiated at an earlier time, for example, at a physical store). In some embodiments, the computer system (e.g., 600 and/or 630) displays, via the one or more display generation components (e.g., 602 and/or 632), information corresponding to the information collected during the visit to a physical store (e.g., displays device fit information and/or device physical configuration information corresponding to the first item based on information collected during a visit to a physical store)). Providing the user with an option to continue a transaction corresponding to an item using information collected during a visit to a physical store enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also reduces the number of inputs needed to complete the transaction.

In some embodiments, the first option (e.g., 616) is displayed within a purchase user interface (e.g., 604) corresponding to an online purchase of the first item (e.g., 606 and/or X606) (e.g., a purchase user interface that includes one or more selectable objects and/or options for purchasing a first item; and/or a purchase user interface that is part of a series of one or more user interfaces that correspond to an online purchase of a first item (in some embodiments, the series of one or more user interfaces includes at least a first user interface that allows a user to enter payment information in order to purchase and/or order the first item; in some embodiments, the series of one or more user interfaces includes at least a first user interface that includes one or more fields for a user to enter a delivery location and/or address for the first item; in some embodiments, the series of one or more user interfaces includes at least a first user interface that includes one or more fields for a user to enter a pickup location for the first item)). Providing the user with an option to continue a transaction corresponding to an item using information collected during a visit to a physical store enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also reduces the number of inputs needed to complete the transaction.

In some embodiments, the first item (e.g., 606 and/or X606) includes a band (e.g., a band that is configured to secure the first device to the body (e.g., the head or other body part) of a person); the plurality of physical dimension configurations includes a plurality of band physical dimension configurations (e.g., a plurality of different band sizes and/or band shapes); and the first physical dimension configuration is a first band physical configuration of the plurality of band physical dimension configurations. Capturing band physical dimension information using a first device, and making the band physical dimension information (e.g., the first band physical dimension configuration) available to other devices enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the band is a headband that is configured to secure the first device (e.g., 606 and/or X606) to the head of a person. Capturing headband physical dimension information using a first device, and making the headband physical dimension information (e.g., the first band physical dimension configuration) available to other devices enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first item (e.g., 606 and/or X606) includes a light seal (e.g., 1-110, 1-210, a component that is configured to block light, and/or a component that is configured to block external light (e.g., some and/or all external light) from reaching the eyes of a person) (e.g., in some embodiments, item 606 and/or item X606 is an extended reality headset); the plurality of physical dimension configurations includes a plurality of light seal physical dimension configurations (e.g., a plurality of different light seal sizes and/or light seal shapes); and the first physical dimension configuration is a first light seal physical dimension configuration of the plurality of light seal physical dimension configurations. Capturing light seal physical dimension information using a first device, and making the light seal physical dimension information (e.g., the first light seal physical dimension configuration) available to other devices enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the device fit information includes vision prescription information corresponding to the person (e.g., right eye prescription, left eye prescription, sphere, cylinder, axis, ADD, prism, and/or pupillary distance). Receiving vision prescription information using a first device, and making the vision prescription information available to other devices enhances the operability of the system and makes the user-system interface more efficient (e.g., by helping the user to provide proper inputs and reducing errors) which, additionally, reduces power usage and improves battery life of the device by enabling the user to use the system more quickly and efficiently.

Note that details of the processes described above with respect to method 800 (e.g., FIG. 8) are also applicable in an analogous manner to the methods described above. For example, method 700 optionally includes one or more of the characteristics of the various methods described above with reference to method 800. For example, in some embodiments, the computer system recited in method 800 is the first external device recited in method 700. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to determine device fit information for a user and assist a user with ordering an item. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to more easily and efficiently order an item and/or pick up where they last left off in ordering the item. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of item ordering services, the present technology can be configured to allow users to select to "opt in" or "opt out" of participation in the collection of personal information data during registration for services or anytime thereafter. In another example, users can select not to provide user-specific information for targeted content delivery services. In yet another example, users can select to limit the length of time user data is maintained or entirely prohibit the development of a user profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users can be directed to go into a physical store or other physical location to determine appropriate device fit without transmitting and/or providing user-specific information, such as user biometric information.

What is claimed is:

1. A computer system configured to communicate with one or more display generation components and one or more input devices, comprising:
   one or more processors; and
   memory storing one or more programs configured to be executed by the one or more processors, the one or more programs including instructions for:
   receiving, via the one or more input devices, a first set of user inputs corresponding to configuring options for a first item;
   in response to receiving the first set of inputs, displaying, via the one or more display generation components, a first prompt instructing a user of the computer system to use a first external device separate from the computer system;
   subsequent to displaying the first prompt, receiving information based on biometric information captured by the first external device; and
   subsequent to receiving the information based on biometric information captured by the first external device, displaying, via the one or more display generation components, a first set of options corresponding to the first item, wherein the first set of options includes at least a first option that has been selected based on the biometric information captured by the first external device.

2. The computer system of claim 1, wherein the first option corresponds to a configuration option for configuring a physical parameter of the first item to fit one or more biometric features corresponding to the biometric information captured by the first external device.

3. The computer system of claim 1, wherein displaying the first prompt comprises displaying a machine-readable code.

4. The computer system of claim 1, wherein:
   the first external device comprises one or more sensors; and
   the computer system does not include the one or more sensors.

5. The computer system of claim 1, wherein the first external device is smaller and/or lighter than the computer system.

6. The computer system of claim 1, wherein the information does not include the biometric information captured by the first external device.

7. The computer system of claim 6, wherein the information is indicative of a first component corresponding to the first item.

8. The computer system of claim 1, wherein the first item is an extended reality headset.

9. The computer system of claim 8, wherein the first option corresponds to a light seal component for the extended reality headset.

10. The computer system of claim 9, wherein the light seal component has a first physical characteristic, and the first physical characteristic is selected from a plurality of light seal physical characteristic options based on vision prescription information for a person.

11. The computer system of claim 8, wherein the first option corresponds to a headband component for the extended reality headset.

12. The computer system of claim 1, wherein the first set of user inputs correspond to user selection of one or more options corresponding to the first item.

13. The computer system of claim 1, the one or more programs further including instructions for:
   receiving, via the one or more input devices, a second set of user inputs corresponding to configuring options for a second item as part of a set of steps corresponding to the second item;
   in response to receiving the second set of inputs, displaying, via the one or more display generation components, a second prompt instructing a user of the computer system to use a second external device separate from the computer system;
   subsequent to displaying the second prompt, receiving information indicating that a person has elected to complete the set of steps corresponding to the second item using the second external device; and in response to receiving the information indicating that the person has elected to complete the set of steps corresponding to the second item using the second external device, displaying, via the one or more display generation components, an indication that a person has elected to complete the set of steps corresponding to the second item using the second external device.

14. The computer system of claim 1, wherein the first option is selected based on the biometric information captured by the first external device and based on a second set of information different from the biometric information captured by the first external device.

15. The computer system of claim 14, wherein the second set of information includes user prescription information.

16. The computer system of claim 1, the one or more programs further including instructions for:

receiving, via the one or more input devices, a third set of user inputs corresponding to configuring options for the first item;

in response to receiving the third set of inputs:

in accordance with a determination that a first type of information corresponding to a user is not available, displaying, via the one or more display generation components, the first prompt instructing the user of the computer system to use the first external device separate from the computer system; and in accordance with a determination that the first type of information corresponding to the user is available, displaying, via the one or more display generation components, a second set of options corresponding to the first item without displaying the first prompt, wherein the second set of options includes at least a second option that has been selected based on the first type of information corresponding to the user.

17. The computer system of claim 16, wherein:

the first type of information corresponding to the user includes user prescription information;

displaying the second set of options corresponding to the first item includes displaying a first light seal option of a plurality of light seal options that has been selected based on the user prescription information; and displaying the second set of options corresponding to the first item further comprises:

in accordance with a determination that current prescription information corresponding to the user contradicts the user prescription information, displaying, via the one or more display generation components, a suggestion for a second light seal option different from the first light seal option, wherein the second light seal option is selected from the plurality of light seal options based on the current prescription information corresponding to the user.

18. The computer system of claim 1, the one or more programs further including instructions for:

displaying, via the one or more display generation components, one or more options corresponding to the first item, including an in-store option that is selectable to initiate a process for scheduling an appointment to view the first item in a physical store location;

while displaying the one or more options corresponding to the first item, receiving, via the one or more input devices, a set of user inputs corresponding to selection of the in-store option; and in response to receiving the set of user inputs corresponding to selection of the in-store option, initiating a process for scheduling an appointment for a user of the computer system to view the first item in a physical store location.

19. The computer system of claim 1, wherein the first external device uses a first portion of a first application to capture the biometric information without downloading a second portion of the first application.

20. The computer system of claim 1, the one or more programs further including instructions for:

subsequent to displaying the first prompt and prior to receiving the information based on biometric information captured by the first external device, displaying, via the one or more display generation components, a first user interface indicative of the computer system waiting to receive information based on biometric information captured by the first external device.

21. The computer system of claim 1, the one or more programs further including instructions for:

in response to receiving the information based on biometric information captured by the first external device, displaying, via the one or more display generation components, a recapture option that is selectable to initiate a process for recapturing biometric information using the first external device;

while displaying the recapture option, receiving, via the one or more input devices, a set of user inputs corresponding to selection of the recapture option; and in response to receiving the set of user inputs corresponding to selection of the recapture option, displaying, via the one or more display generation components, the first prompt.

22. A non-transitory computer-readable storage medium storing one or more programs configured to be executed by one or more processors of a computer system that is in communication with one or more display generation components and one or more input devices, the one or more programs including instructions for:

receiving, via the one or more input devices, a first set of user inputs corresponding to configuring options for a first item;

in response to receiving the first set of inputs, displaying, via the one or more display generation components, a first prompt instructing a user of the computer system to use a first external device separate from the computer system;

subsequent to displaying the first prompt, receiving information based on biometric information captured by the first external device; and subsequent to receiving the information based on biometric information captured by the first external device, displaying, via the one or more display generation components, a first set of options corresponding to the first item, wherein the first set of options includes at least a first option that has been selected based on the biometric information captured by the first external device.

23. A method, comprising:

at a computer system that is in communication with one or more display generation components and one or more input devices:

receiving, via the one or more input devices, a first set of user inputs corresponding to configuring options for a first item;

in response to receiving the first set of inputs, displaying, via the one or more display generation components, a first prompt instructing a user of the computer system to use a first external device separate from the computer system;

subsequent to displaying the first prompt, receiving information based on biometric information captured by the first external device; and subsequent to receiving the information based on biometric information captured by the first external device, displaying, via the one or more display generation components, a first set of options corresponding to the first item, wherein the first set of options includes at least a first option that has been selected based on the biometric information captured by the first external device.

24. The non-transitory computer-readable storage medium of claim 22, wherein the first option corresponds to a configuration option for configuring a physical parameter of the first item to fit one or more biometric features corresponding to the biometric information captured by the first external device.

25. The non-transitory computer-readable storage medium of claim 22, wherein displaying the first prompt comprises displaying a machine-readable code.

26. The non-transitory computer-readable storage medium of claim 22, wherein:
the first external device comprises one or more sensors; and
the computer system does not include the one or more sensors.

27. The non-transitory computer-readable storage medium of claim 22, wherein the first external device is smaller and/or lighter than the computer system.

28. The non-transitory computer-readable storage medium of claim 22, wherein the information does not include the biometric information captured by the first external device.

29. The non-transitory computer-readable storage medium of claim 28, wherein the information is indicative of a first component corresponding to the first item.

30. The non-transitory computer-readable storage medium of claim 22, wherein the first item is an extended reality headset.

31. The non-transitory computer-readable storage medium of claim 30, wherein the first option corresponds to a light seal component for the extended reality headset.

32. The non-transitory computer-readable storage medium of claim 31, wherein the light seal component has a first physical characteristic, and the first physical characteristic is selected from a plurality of light seal physical characteristic options based on vision prescription information for a person.

33. The non-transitory computer-readable storage medium of claim 30, wherein the first option corresponds to a headband component for the extended reality headset.

34. The non-transitory computer-readable storage medium of claim 22, wherein the first set of user inputs correspond to user selection of one or more options corresponding to the first item.

35. The non-transitory computer-readable storage medium of claim 22, the one or more programs further including instructions for:
receiving, via the one or more input devices, a second set of user inputs corresponding to configuring options for a second item as part of a set of steps corresponding to the second item;
in response to receiving the second set of inputs, displaying, via the one or more display generation components, a second prompt instructing a user of the computer system to use a second external device separate from the computer system;
subsequent to displaying the second prompt, receiving information indicating that a person has elected to complete the set of steps corresponding to the second item using the second external device; and
in response to receiving the information indicating that the person has elected to complete the set of steps corresponding to the second item using the second external device, displaying, via the one or more display generation components, an indication that a person has elected to complete the set of steps corresponding to the second item using the second external device.

36. The non-transitory computer-readable storage medium of claim 22, wherein the first option is selected based on the biometric information captured by the first external device and based on a second set of information different from the biometric information captured by the first external device.

37. The non-transitory computer-readable storage medium of claim 36, wherein the second set of information includes user prescription information.

38. The non-transitory computer-readable storage medium of claim 22, the one or more programs further including instructions for:
receiving, via the one or more input devices, a third set of user inputs corresponding to configuring options for the first item;
in response to receiving the third set of inputs:
in accordance with a determination that a first type of information corresponding to a user is not available, displaying, via the one or more display generation components, the first prompt instructing the user of the computer system to use the first external device separate from the computer system; and
in accordance with a determination that the first type of information corresponding to the user is available, displaying, via the one or more display generation components, a second set of options corresponding to the first item without displaying the first prompt, wherein the second set of options includes at least a second option that has been selected based on the first type of information corresponding to the user.

39. The non-transitory computer-readable storage medium of claim 38, wherein:
the first type of information corresponding to the user includes user prescription information;
displaying the second set of options corresponding to the first item includes displaying a first light seal option of a plurality of light seal options that has been selected based on the user prescription information; and
displaying the second set of options corresponding to the first item further comprises:
in accordance with a determination that current prescription information corresponding to the user contradicts the user prescription information, displaying, via the one or more display generation components, a suggestion for a second light seal option different from the first light seal option, wherein the second light seal option is selected from the plurality of light seal options based on the current prescription information corresponding to the user.

40. The non-transitory computer-readable storage medium of claim 22, the one or more programs further including instructions for:
displaying, via the one or more display generation components, one or more options corresponding to the first item, including an in-store option that is selectable to initiate a process for scheduling an appointment to view the first item in a physical store location;
while displaying the one or more options corresponding to the first item, receiving, via the one or more input devices, a set of user inputs corresponding to selection of the in-store option; and
in response to receiving the set of user inputs corresponding to selection of the in-store option, initiating a process for scheduling an appointment for a user of the computer system to view the first item in a physical store location.

41. The non-transitory computer-readable storage medium of claim 22, wherein the first external device uses a first portion of a first application to capture the biometric information without downloading a second portion of the first application.

42. The non-transitory computer-readable storage medium of claim 22, the one or more programs further including instructions for:
subsequent to displaying the first prompt and prior to receiving the information based on biometric information captured by the first external device, displaying, via the one or more display generation components, a first user interface indicative of the computer system waiting to receive information based on biometric information captured by the first external device.

43. The non-transitory computer-readable storage medium of claim 22, the one or more programs further including instructions for:
in response to receiving the information based on biometric information captured by the first external device, displaying, via the one or more display generation components, a recapture option that is selectable to initiate a process for recapturing biometric information using the first external device;
while displaying the recapture option, receiving, via the one or more input devices, a set of user inputs corresponding to selection of the recapture option; and
in response to receiving the set of user inputs corresponding to selection of the recapture option, displaying, via the one or more display generation components, the first prompt.

44. The method of claim 23, wherein the first option corresponds to a configuration option for configuring a physical parameter of the first item to fit one or more biometric features corresponding to the biometric information captured by the first external device.

45. The method of claim 23, wherein displaying the first prompt comprises displaying a machine-readable code.

46. The method of claim 23, wherein:
the first external device comprises one or more sensors; and
the computer system does not include the one or more sensors.

47. The method of claim 23, wherein the first external device is smaller and/or lighter than the computer system.

48. The method of claim 23, wherein the information does not include the biometric information captured by the first external device.

49. The method of claim 48, wherein the information is indicative of a first component corresponding to the first item.

50. The method of claim 23, wherein the first item is an extended reality headset.

51. The method of claim 50, wherein the first option corresponds to a light seal component for the extended reality headset.

52. The method of claim 51, wherein the light seal component has a first physical characteristic, and the first physical characteristic is selected from a plurality of light seal physical characteristic options based on vision prescription information for a person.

53. The method of claim 50, wherein the first option corresponds to a headband component for the extended reality headset.

54. The method of claim 23, wherein the first set of user inputs correspond to user selection of one or more options corresponding to the first item.

55. The method of claim 23, further comprising:
receiving, via the one or more input devices, a second set of user inputs corresponding to configuring options for a second item as part of a set of steps corresponding to the second item;
in response to receiving the second set of inputs, displaying, via the one or more display generation components, a second prompt instructing a user of the computer system to use a second external device separate from the computer system;
subsequent to displaying the second prompt, receiving information indicating that a person has elected to complete the set of steps corresponding to the second item using the second external device; and
in response to receiving the information indicating that the person has elected to complete the set of steps corresponding to the second item using the second external device, displaying, via the one or more display generation components, an indication that a person has elected to complete the set of steps corresponding to the second item using the second external device.

56. The method of claim 23, wherein the first option is selected based on the biometric information captured by the first external device and based on a second set of information different from the biometric information captured by the first external device.

57. The method of claim 56, wherein the second set of information includes user prescription information.

58. The method of claim 23, further comprising:
receiving, via the one or more input devices, a third set of user inputs corresponding to configuring options for the first item;
in response to receiving the third set of inputs:
in accordance with a determination that a first type of information corresponding to a user is not available, displaying, via the one or more display generation components, the first prompt instructing the user of the computer system to use the first external device separate from the computer system; and
in accordance with a determination that the first type of information corresponding to the user is available, displaying, via the one or more display generation components, a second set of options corresponding to the first item without displaying the first prompt, wherein the second set of options includes at least a second option that has been selected based on the first type of information corresponding to the user.

59. The method of claim 58, wherein:

the first type of information corresponding to the user includes user prescription information;

displaying the second set of options corresponding to the first item includes displaying a first light seal option of a plurality of light seal options that has been selected based on the user prescription information; and displaying the second set of options corresponding to the first item further comprises:
- in accordance with a determination that current prescription information corresponding to the user contradicts the user prescription information, displaying, via the one or more display generation components, a suggestion for a second light seal option different from the first light seal option, wherein the second light seal option is selected from the plurality of light seal options based on the current prescription information corresponding to the user.

60. The method of claim 23, further comprising:

displaying, via the one or more display generation components, one or more options corresponding to the first item, including an in-store option that is selectable to initiate a process for scheduling an appointment to view the first item in a physical store location;

while displaying the one or more options corresponding to the first item, receiving, via the one or more input devices, a set of user inputs corresponding to selection of the in-store option; and in response to receiving the set of user inputs corresponding to selection of the in-store option, initiating a process for scheduling an appointment for a user of the computer system to view the first item in a physical store location.

61. The method of claim 23, wherein the first external device uses a first portion of a first application to capture the biometric information without downloading a second portion of the first application.

62. The method of claim 23, further comprising:

subsequent to displaying the first prompt and prior to receiving the information based on biometric information captured by the first external device, displaying, via the one or more display generation components, a first user interface indicative of the computer system waiting to receive information based on biometric information captured by the first external device.

63. The method of claim 23, further comprising:

in response to receiving the information based on biometric information captured by the first external device, displaying, via the one or more display generation components, a recapture option that is selectable to initiate a process for recapturing biometric information using the first external device;

while displaying the recapture option, receiving, via the one or more input devices, a set of user inputs corresponding to selection of the recapture option; and in response to receiving the set of user inputs corresponding to selection of the recapture option, displaying, via the one or more display generation components, the first prompt.

\* \* \* \* \*